US011835098B2

(12) United States Patent
Ishiguro et al.

(10) Patent No.: US 11,835,098 B2
(45) Date of Patent: Dec. 5, 2023

(54) DISC BRAKE DEVICE AND DISC BRAKE PAD

(71) Applicant: AKEBONO BRAKE INDUSTRY CO., LTD., Tokyo (JP)

(72) Inventors: Isao Ishiguro, Tokyo (JP); Ryo Otake, Tokyo (JP); Keisuke Morita, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 198 days.

(21) Appl. No.: 17/352,786

(22) Filed: Jun. 21, 2021

(65) Prior Publication Data

US 2021/0396283 A1 Dec. 23, 2021

(30) Foreign Application Priority Data

Jun. 22, 2020 (JP) ................. 2020-107227

(51) Int. Cl.
*F16D 65/04* (2006.01)
*F16D 55/228* (2006.01)
*B60T 1/06* (2006.01)
*F16D 65/095* (2006.01)
*F16D 65/18* (2006.01)
*F16D 121/04* (2012.01)

(52) U.S. Cl.
CPC ............ *F16D 55/228* (2013.01); *B60T 1/065* (2013.01); *F16D 65/095* (2013.01); *F16D 65/183* (2013.01); *F16D 2121/04* (2013.01); *F16D 2250/0069* (2013.01)

(58) Field of Classification Search
CPC .... F16D 55/228; F16D 65/095; F16D 65/183; F16D 2121/04; F16D 2250/0069

USPC ...... 188/250 B, 250 F, 250 G, 251 A, 251 M
See application file for complete search history.

(56) References Cited

U.S. PATENT DOCUMENTS 3,424,276 A 1/1969 Robinette
5,615,754 A 4/1997 Kobayashi et al.
(Continued)

FOREIGN PATENT DOCUMENTS

DE 102017204714 A1 6/2018
JP H07-259898 A 10/1995
(Continued)

OTHER PUBLICATIONS

The Extended European Search Report dated Mar. 25, 2022 in European Patent Application No. 21180073.5.

*Primary Examiner* — Christopher P Schwartz
(74) *Attorney, Agent, or Firm* — Faegre Drinker Biddle Reath LLP

(57) ABSTRACT

A disc brake device includes a pair of pads, a pad support member supporting at least one of the pair of pads in a movable manner in an axial direction, and a plurality of pistons configured to press the one of the pads toward the rotor in the axial direction. Slide engagement portions engaged with the pad support member so as to be movable in the axial direction are respectively provided at both side portions of the one of the pads in a circumferential direction. The one of the pads is fixed to a tip end portion of at least one piston including a piston arranged at an end portion on a rotation-in side or a rotation-out side among the plurality of pistons, and is not fixed to a tip end portion of a remaining piston.

18 Claims, 21 Drawing Sheets

(56) References Cited

U.S. PATENT DOCUMENTS

| | | | |
|---|---|---|---|
| 5,620,063 A * | 4/1997 | Smith | F16D 55/228 |
| | | | 188/240 |
| 11,320,011 B2 * | 5/2022 | Morio | F16D 55/228 |
| 2015/0122602 A1 * | 5/2015 | Shimamura | F16D 55/228 |
| | | | 188/250 E |
| 2016/0108978 A1 | 4/2016 | Adams | |
| 2021/0054891 A1 * | 2/2021 | Yamazaki | F16D 65/092 |
| 2021/0054892 A1 * | 2/2021 | Divakaruni | F16D 65/095 |

FOREIGN PATENT DOCUMENTS

| | | |
|---|---|---|
| JP | 2010-031960 A | 2/2010 |
| JP | 2011-117594 A | 6/2011 |
| JP | 2015-090201 A | 5/2015 |

* cited by examiner

DISC BRAKE DEVICE AND DISC BRAKE PAD

CROSS-REFERENCE TO RELATED APPLICATIONS

The disclosure of Japanese Patent Application No. 2020-107227 filed on Jun. 22, 2020, including specification, drawings and claims is incorporated herein by reference in its entirety.

BACKGROUND

The present invention relates to a disc brake device and a pad constituting the disc brake device.

Two types of structures, a floating type and an opposed piston type, are widely known as disc brake devices for automobiles. In any of the structures, the disc brake device includes a pair of pads arranged on both sides of a rotor, which rotates together with wheels, in an axial direction, and a pad support member that movably supports at least one of the pair of pads in the axial direction, and performs braking of the automobile by pressing the pair of pads against both side surfaces of the rotor in the axial direction. In such a disc brake device, the pad and the pad support member may collide with each other, resulting in occurrence of an abnormal noise referred to as a clunk noise (a striking sound or a clicking sound).

JP-A-2015-90201 discloses a structure of a disc brake device capable of preventing occurrence of a clunk noise. FIGS. 24 to 26 show the disc brake device disclosed in JP-A-2015-90201. A disc brake device 1 includes a caliper 2 serving as a pad support member, an inner pad 3 and an outer pad 4.

The caliper 2 supports movably the inner pad 3 and the outer pad 4 in an axial direction (an upper-lower direction in FIG. 24, a front-back direction in FIG. 25). The caliper 2 includes an inner body 6 and an outer body 7 that are arranged on both sides of a rotor 5 (see FIG. 24) in the axial direction, and a rotation-in side coupling portion 8, a rotation-out side coupling portion 9 and an intermediate coupling portion 10 that respectively couple the inner body 6 and the outer body 7 in the axial direction. The rotation-in side coupling portion 8 has an abutted surface 11 at a portion facing the intermediate coupling portion 10 in a circumferential direction.

Regarding the disc brake device 1, the axial direction, the circumferential direction and a radial direction refer to an axial direction, a circumferential direction and a radial direction of the rotor 5 unless otherwise specified.

Each of the inner body 6 and the outer body 7 includes a pin 12 and a guide recessed groove 13 to movably support the inner pad 3 and the outer pad 4 in the axial direction. The pin 12 is provided at a radially inner side portion of one side portion of each of the inner body 6 and the outer body 7 in the circumferential direction, and is arranged parallel to a central axis of the rotor 5. The guide recessed groove 13 is provided in a guide wall portion 14 provided on an axially inner side portion of the other side portion of each of the inner body 6 and the outer body 7 in the circumferential direction. The guide recessed groove 13 is provided in a radially intermediate portion of the guide wall portion 14, and is open on an axially inner side surface of the guide wall portion 14 and a side surface on one side of the guide wall portion 14 in the circumferential direction. In the shown example, one side in the circumferential direction corresponds to a rotation-in side when a vehicle is moving forward, and the other side in the circumferential direction corresponds to a rotation-out side when the vehicle is moving forward. Each of the inner body 6 and the outer body 7 has a plurality of cylinders (not shown), and a piston is fitted to each cylinder so as to be movable in the axial direction.

Each of the inner pad 3 and the outer pad 4 includes a lining 15 and a back plate 16 supporting a back surface of the lining 15. The back plate 16 has a substantially rectangular insertion hole 17 corresponding to a slide engagement portion in a radially inner side portion of one side portion in the circumferential direction, and has a protruding lug portion 18 corresponding to a slide engagement portion on the other side portion in the circumferential direction. The back plate 16 has an abutting surface 19 on a radially outer side portion of a side surface on the one side in the circumferential direction.

The pin 12, which is provided at the one side portion of each of the inner body 6 and the outer body 7 in the circumferential direction, is inserted into the insertion hole 17 in the axial direction. Thereby, the insertion hole 17 is movably engaged with the pin 12 in the axial direction. The lug portion 18 is engaged with the guide recessed groove 13 provided in the other side portion of each of the inner body 6 and the outer body 7 in the circumferential direction so as to be movable in the axial direction.

The disc brake device 1 further includes a pad spring 20 to prevent occurrence of rattling of the inner pad 3 and the outer pad 4 during non-braking. The pad spring 20 is made of a metal plate and includes a pair of rotation-in side pressing portions 21a, 21b on the one side in the circumferential direction, and a pair of rotation-out side pressing portions 22a, 22b on the other side in the circumferential direction. Each of the pair of rotation-in side pressing portions 21a, 21b presses one side portion of a radially outer side edge portion of the back plate 16 in the circumferential direction of each of the inner pad 3 and the outer pad 4 toward a radially inner side. Each of the pair of rotation-out side pressing portions 22a, 22b presses the other side portion of the radially outer side edge portion of the back plate 16 in the circumferential direction of each of the inner pad 3 and the outer pad 4 toward the radially inner side.

The disc brake device 1 generates a moment on each of the inner pad 3 and the outer pad 4 in the following direction during braking. This will be described below with reference to FIGS. 26A and 26B.

During forward braking, as shown in FIG. 26A, a brake tangential force F1 directed to the other side in the circumferential direction (a left side in FIG. 26A and a rotation-out side) acts on a point A at a friction surface center of the lining 15 constituting the inner pad 3 (the outer pad 4). Thereby, the insertion hole 17 provided on a radially inner side with respect to a line of action of the brake tangential force F1 is engaged with the pin 12 to support the brake tangential force F1. Therefore, during the forward braking, a moment M1 acts on the inner pad 3 (the outer pad 4) to rotate the inner pad 3 (the outer pad 4) counterclockwise.

During reverse braking, as shown in FIG. 26B, a brake tangential force F2 directed to the one side in the circumferential direction (a right side in FIG. 26B and a rotation-in side) acts on the point A at the friction surface center of the lining 15. Thereby, in the side surface of the back plate 16 on the one side in the circumferential direction, the abutting surface 19 provided on a radially outer side with respect to a line of action of the brake tangential force F2 abuts against the abutted surface 11 to support the brake tangential force F2. Therefore, during the reverse braking, a moment M2 in a direction the same as the moment M1 acts on the inner pad 3 (the outer pad 4) to rotate the inner pad 3 (the outer pad 4) counterclockwise.

As described above, in the disc brake device 1 disclosed in JP-A-2015-90201, the directions of the moments M1, M2 acting on the inner pad 3 and the outer pad 4 can match during the forward braking and the reverse braking. Therefore, even when the forward braking and the reverse braking are repeated, a posture of each of the inner pad 3 and the outer pad 4 can be maintained in a state of being rotated counterclockwise, and the occurrence of the clunk noise can be prevented.

Further, the pad spring 20 presses both side portions of the back plate 16 in the circumferential direction of each of the inner pad 3 and the outer pad 4 toward the radially inner side. Therefore, in a non-braking state, a radially outer side surface in an inner peripheral surface of the insertion hole 17 located on a radially outer side can be pressed against a radially outer side end portion of an outer circumferential surface of the pin 12. Further, a radially inner side surface of the lug portion 18 can be pressed against a radially inner side surface of the guide recessed groove 13. Therefore, even in the non-braking state, the posture of each of the inner pad 3 and the outer pad 4 can be stabilized, and occurrence of a rattling noise (an abnormal noise) due to rattling of the pad can be prevented.

Patent Literature 1: JP-A-2015-90201

SUMMARY

According to an advantageous aspect of the present invention, there is provided a disc brake device comprising:
 a pair of pads arranged on both sides of a rotor in an axial direction so as to sandwich the rotor;
 a pad support member supporting at least one of the pair of pads in a movable manner in the axial direction;
 a plurality of pistons configured to press the one of the pads toward the rotor in the axial direction,
 wherein slide engagement portions engaged with the pad support member so as to be movable in the axial direction are respectively provided at both side portions of the one of the pads in a circumferential direction, and
 wherein the one of the pads is fixed to a tip end portion of at least one piston including a piston arranged at an end portion on a rotation-in side or a rotation-out side among the plurality of pistons, and is not fixed to a tip end portion of a remaining piston.

The one of the pads may be adhesively fixed to the tip end portion of at least one piston including the piston arranged at the end portion on the rotation-in side or the rotation-out side among the plurality of pistons, by an adhesive.

The one of the pads may be fixed only to the tip end portion of one piston arranged at the end portion on the rotation-in side among the plurality of pistons.

The pad support member may be a caliper, and the plurality of pistons may be fitted to a plurality of cylinders provided in any one of an inner body and an outer body of the caliper.

The one of the pads may include a lining and a back plate, and the back plate may include the slide engagement portions at the both side portions in the circumferential direction respectively, and the tip end portion of at least one piston including the piston arranged at the end portion on the rotation-in side or the rotation-out side among the plurality of pistons, may be fixed to a back surface of the back plate.

The one pad may include a lining, a back plate and a shim plate. The back plate may include the slide engagement portions at the both side portions in the circumferential direction respectively. The shim plate may be attached to the back plate so as to cover a back surface of the back plate, and the tip end portion of at least one piston including the piston arranged at the end portion on the rotation-in side or the rotation-out side among the plurality of pistons, may be fixed to the back surface of the back plate.

According to another advantageous aspect of the present invention, there is provided a disc brake pad, configured to be supported by a pad support member so as to be movable in an axial direction and to be pressed in the axial direction toward a rotor by a plurality of pistons, the disc brake pad comprising:
 a lining; and
 a back plate,
 wherein slide engagement portions engaged with the pad support member so as to be movable in the axial direction are respectively provided at both side portions of the back plate in the circumferential direction, and
 wherein the back plate has an adhesive surface at a portion where a tip end portion of at least one piston including a piston arranged at an end portion on a rotation-in side or a rotation-out side among the plurality of pistons is in contact, and a non-adhesive surface at a portion there a tip end portion of a remaining piston is in contact.

According to another advantageous aspect of the present invention, there is provided a disc brake pad, configured to be supported by a pad support member so as to be movable in an axial direction and to be pressed in the axial direction toward a rotor by a plurality of pistons, the disc brake pad comprising:
 a lining;
 a back plate; and
 a shim plate,
 wherein slide engagement portions engaged with the pad support member so as to be movable in the axial direction are respectively provided at both side portions of the back plate in the circumferential direction, and
 wherein the shim plate is attached to the back plate so as to cover a back surface of the back plate, and
 wherein the shim plate has an adhesive surface at a portion where a tip end portion of at least one piston including a piston arranged at an end portion on a rotation-in side or a rotation-out side among the plurality of pistons is in contact, and a non-adhesive surface at a portion where a tip end portion of a remaining piston is in contact.

The adhesive surface may be formed of a sheet-shaped adhesive.

The sheet-shaped adhesive may be covered with a release paper that is engaged with a part of the back plate, and is positioned with respect to the back plate.

The back plate may further include a protrusion protruding in the axial direction on the back surface, and the release paper may be engaged with the protrusion.

The sheet-shaped adhesive may be positioned with respect to the back plate by being directly engaged with a part of the back plate.

The back plate may further include a protrusion protruding in the axial direction on the back surface, and the sheet-shaped adhesive may be engaged with the protrusion.

BRIEF DESCRIPTION OF DRAWINGS

FIG. 26A shows a state during forward braking, and FIG. 26B shows a state during reverse braking.

DETAILED DESCRIPTION OF EXEMPLIFIED EMBODIMENTS

Figure 26A:
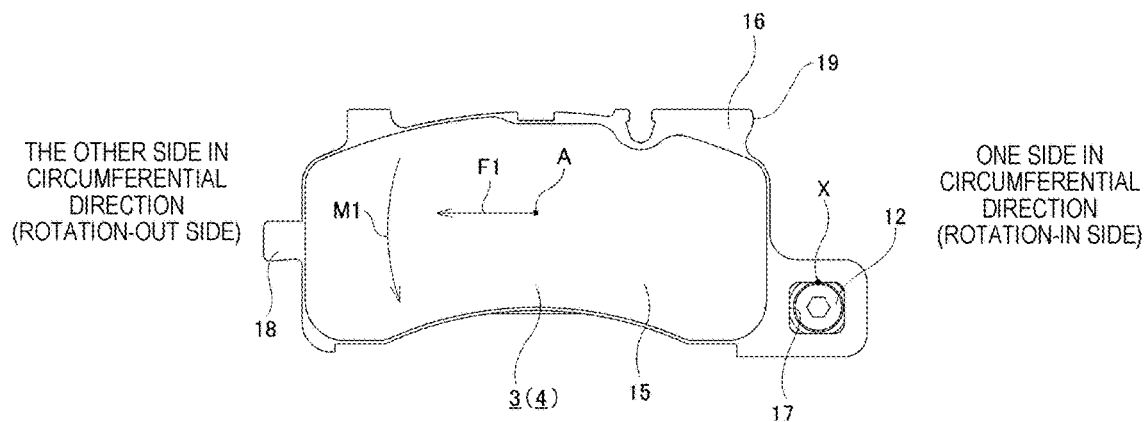
FIGS. 26A and 26B are front views showing a pad taken out.
Figure 26B:
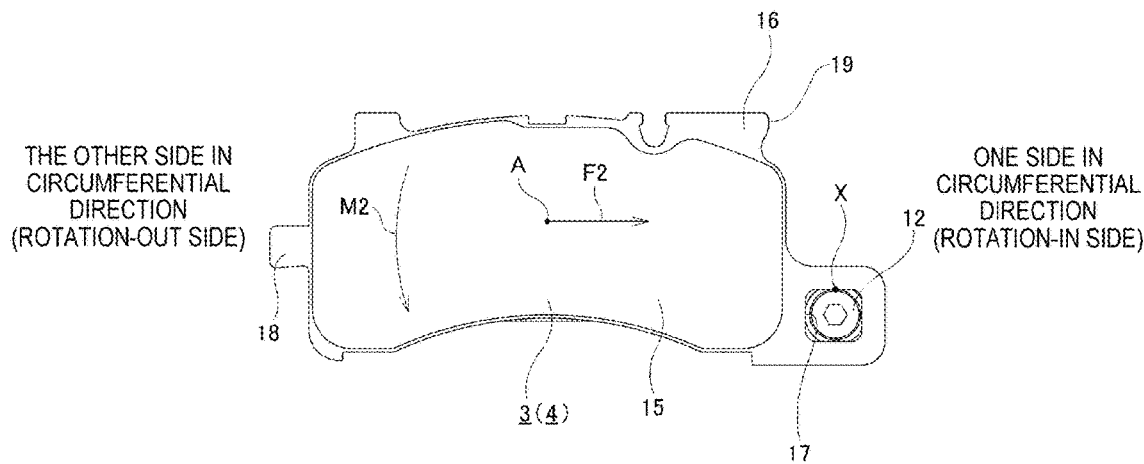

In the disc brake device 1 disclosed in JP-A-2015-90201, during the forward braking and the reverse braking, a gap is likely to be formed between the radially outer side surface in the inner peripheral surface of the insertion hole 17 and the radially outer side end portion of the outer circumferential surface of the pin 12 (an X portion in FIGS. 26A and 26B) due to the moments M1, M2 acting on the inner pad 3 and the outer pad 4. Therefore, when a braking force is released, the radially outer side surface in the inner peripheral surface of the insertion hole 17 vigorously collides with the radially outer side end portion of the outer circumferential surface of the pin 12 due to a pressing force of the pad spring 20, and thus the clunk noise may occur.

In a disc brake device having a related-art structure, such as the disc brake device 1 disclosed in JP-A-2015-90201, there is a problem that when the braking force is released, the slide engagement portion provided at one side portion or the other side portion of the pad in the circumferential direction vigorously collides with the pad support member, and thus the clunk noise is likely to occur.

The present invention has been made to solve the above problems, and an object thereof is to provide a disc brake device and a disc brake pad capable of preventing occurrence of a clunk noise.

First Example of Embodiment

A first example of an embodiment will be described with reference to FIGS. 1 to 14.

[Overall Configuration of Disc Brake Device]

A disc brake device 1a according to this example is an opposed piston type disc brake device used for braking an automobile, and includes a caliper 2a corresponding to a pad support member, an inner pad 3a and an outer pad 4a that are a pair of pads, and a plurality of pistons 27a, 27b, 27c, 28a, 28b (five pistons in each of the inner pad 3a and an outer pad 4a, and ten pistons in total) that respectively press the inner pad 3a and the outer pad 4a in an axial direction toward a rotor 5.

Figure 1:
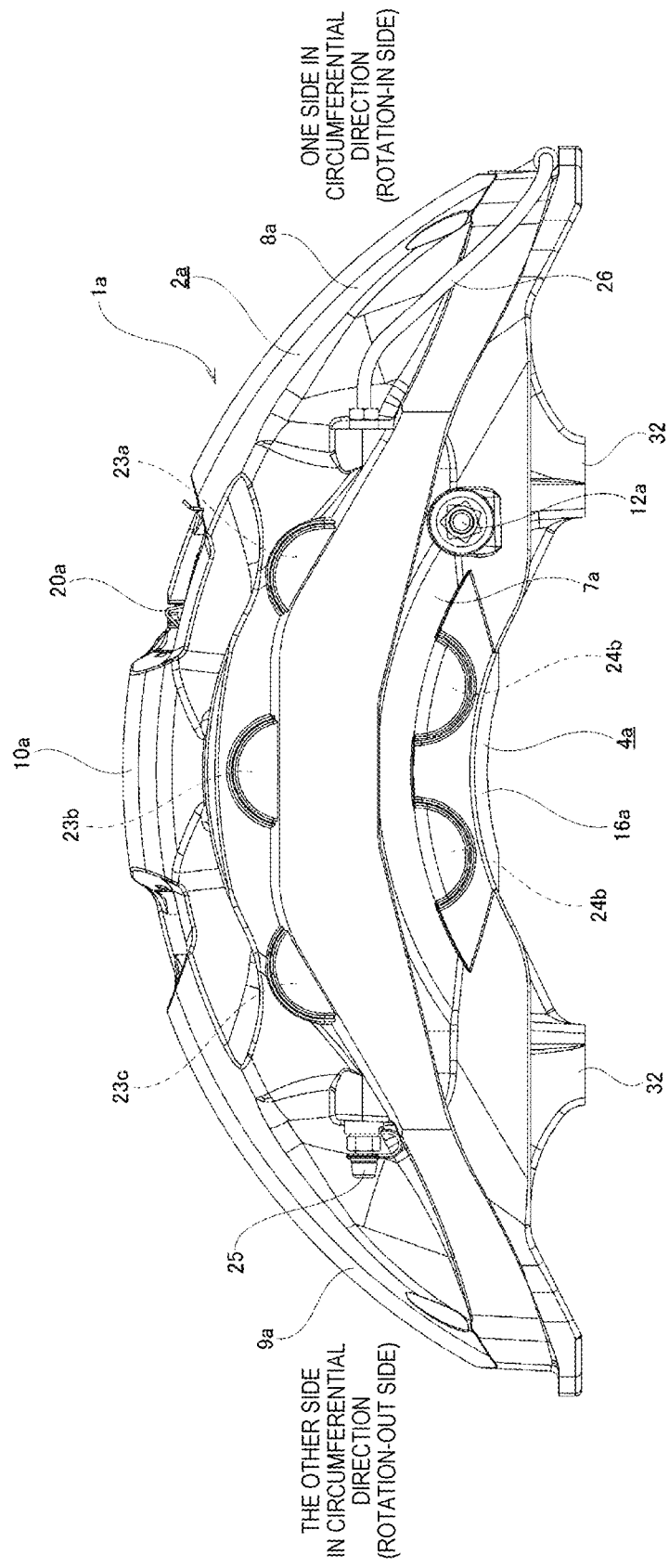
FIG. 1 is a front view showing a disc brake device according to a first example of an embodiment.
Figure 2:
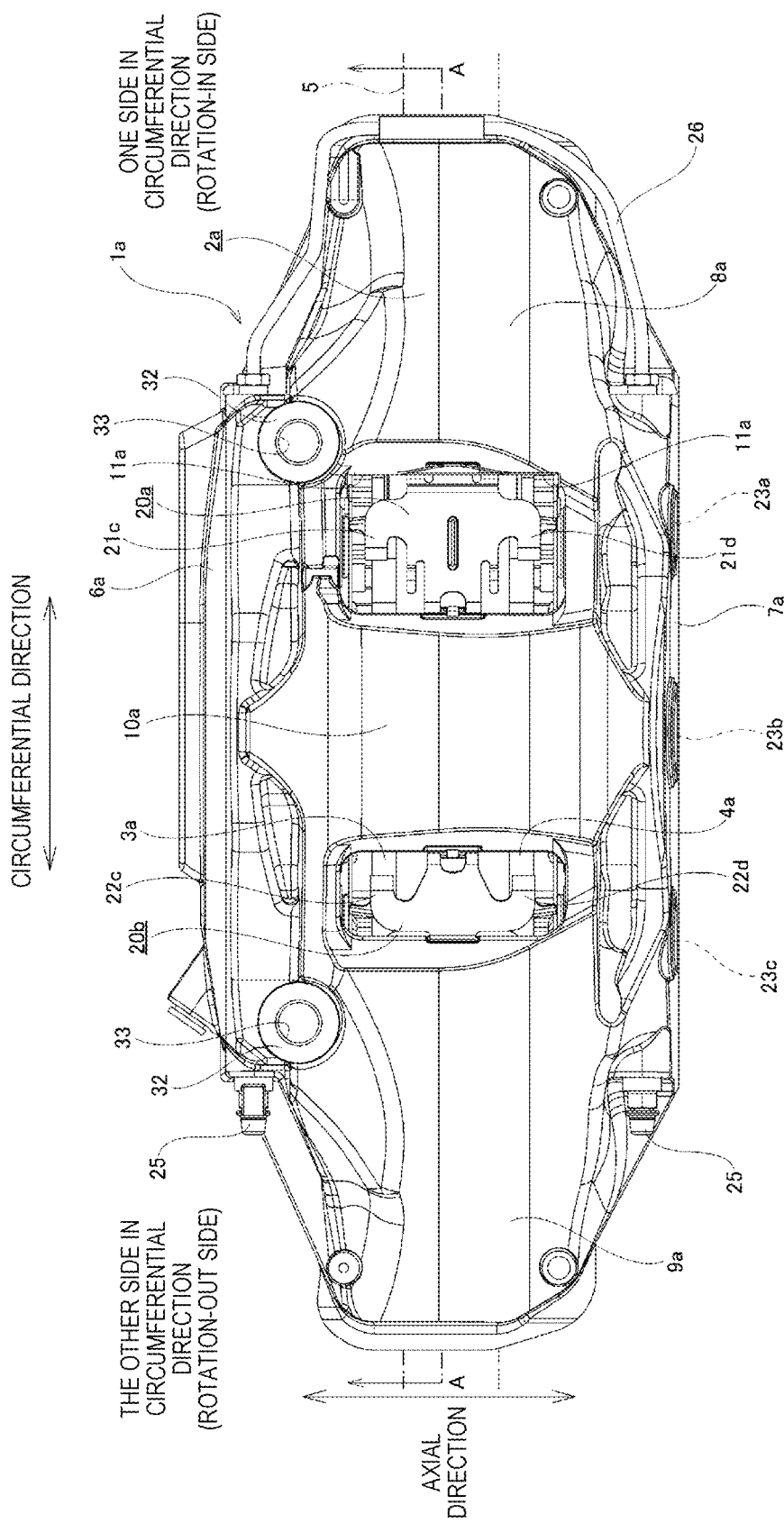
FIG. 2 is a plan view showing the disc brake device according to the first example of the embodiment.
Figure 3:
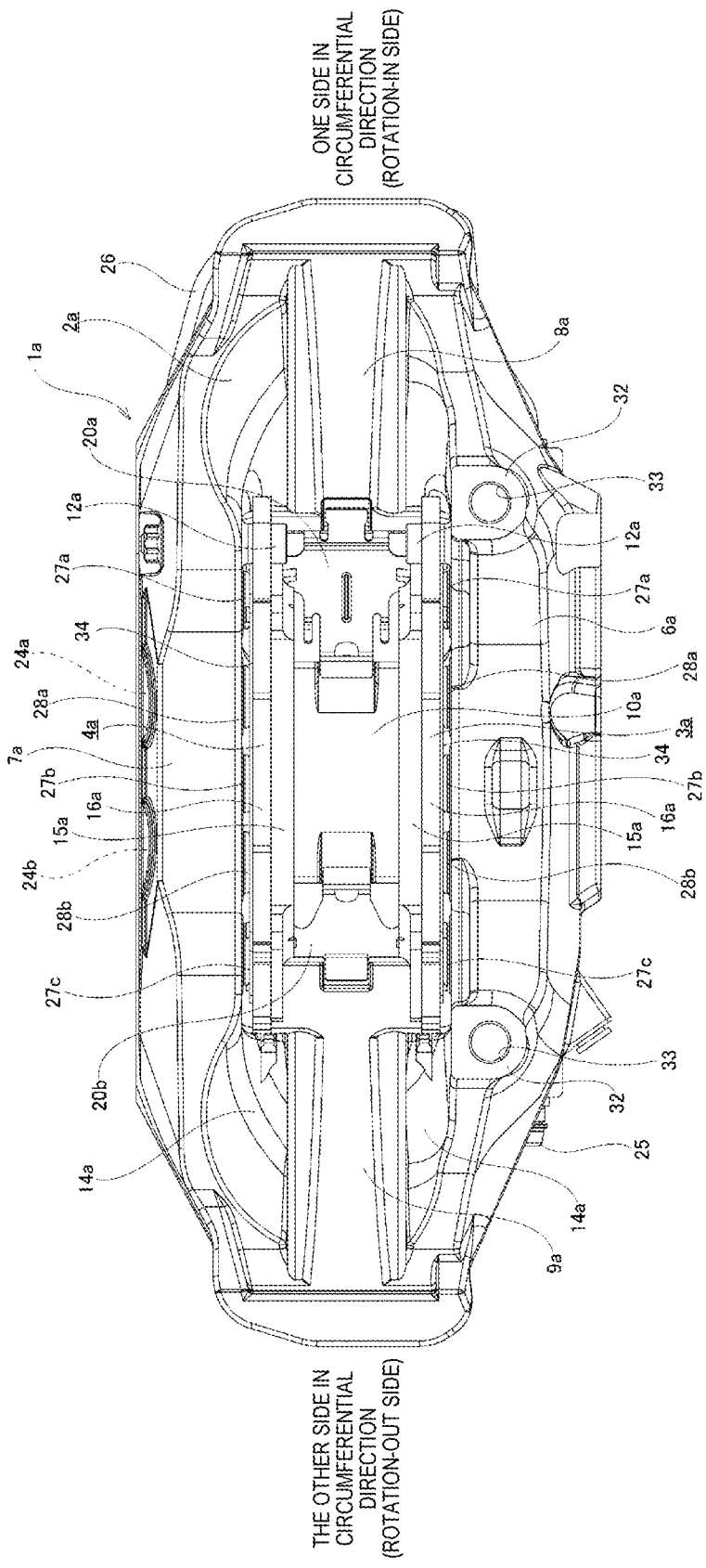
FIG. 3 is a bottom view showing the disc brake device according to the first example of the embodiment.
Figure 4:
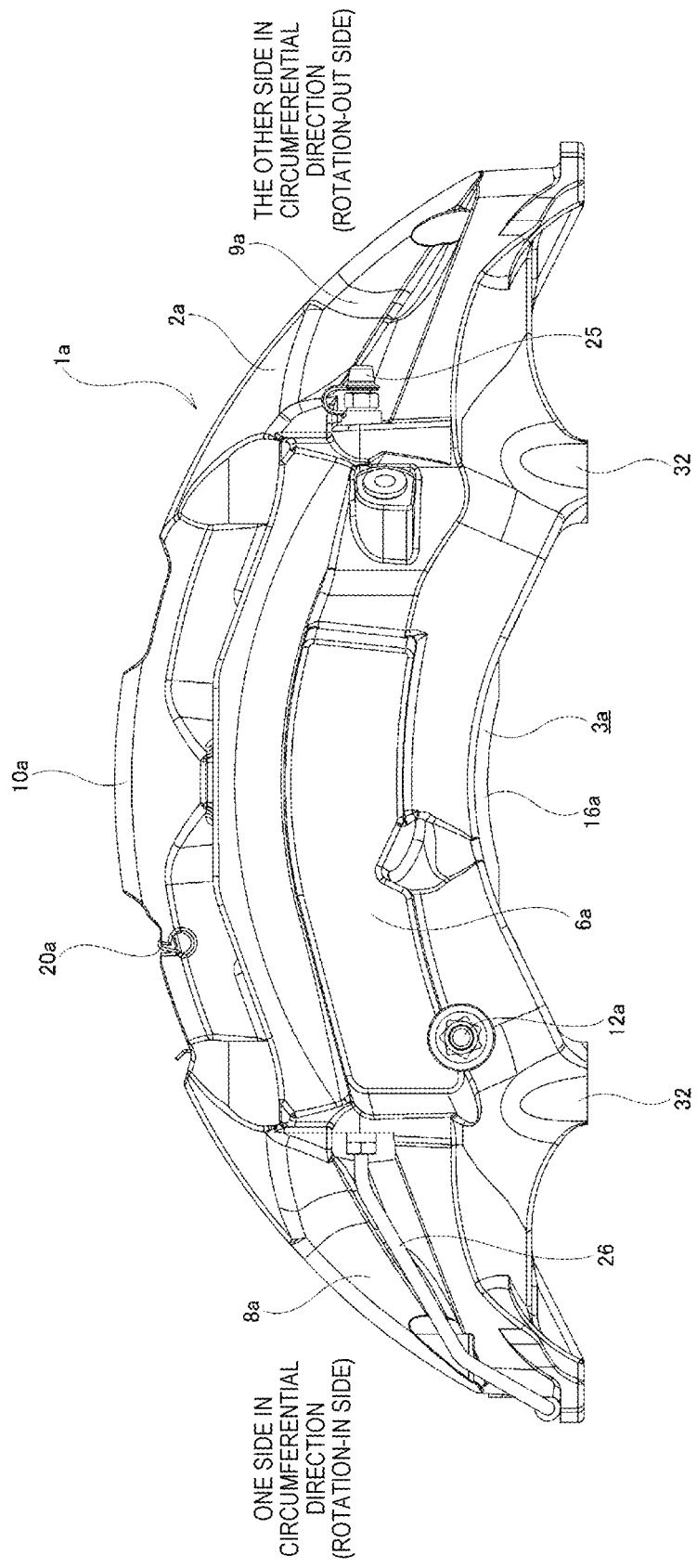
FIG. 4 is a rear view showing the disc brake device according to the first example of the embodiment.
Figure 5:
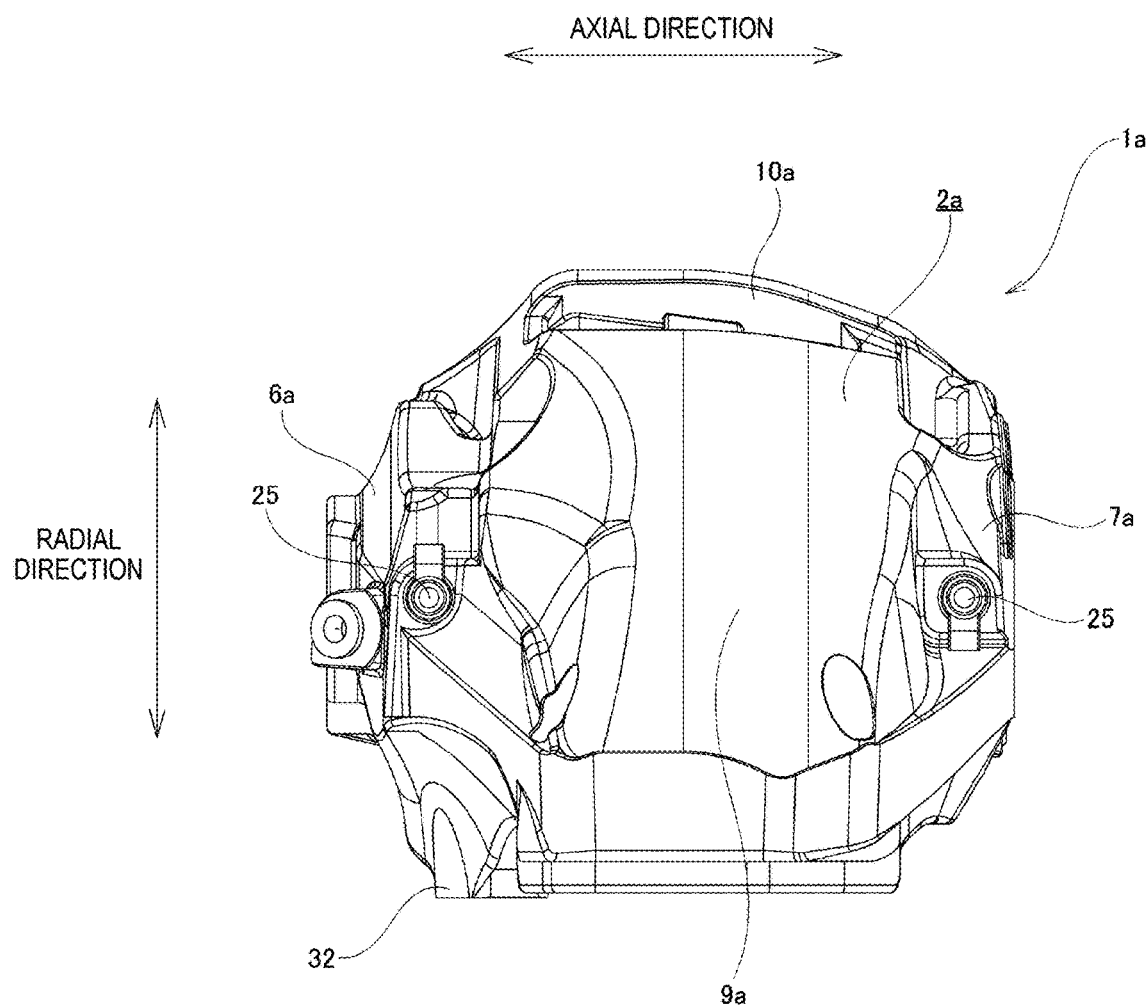
FIG. 5 is a side view showing the disc brake device according to the first example of the embodiment.
Figure 6:
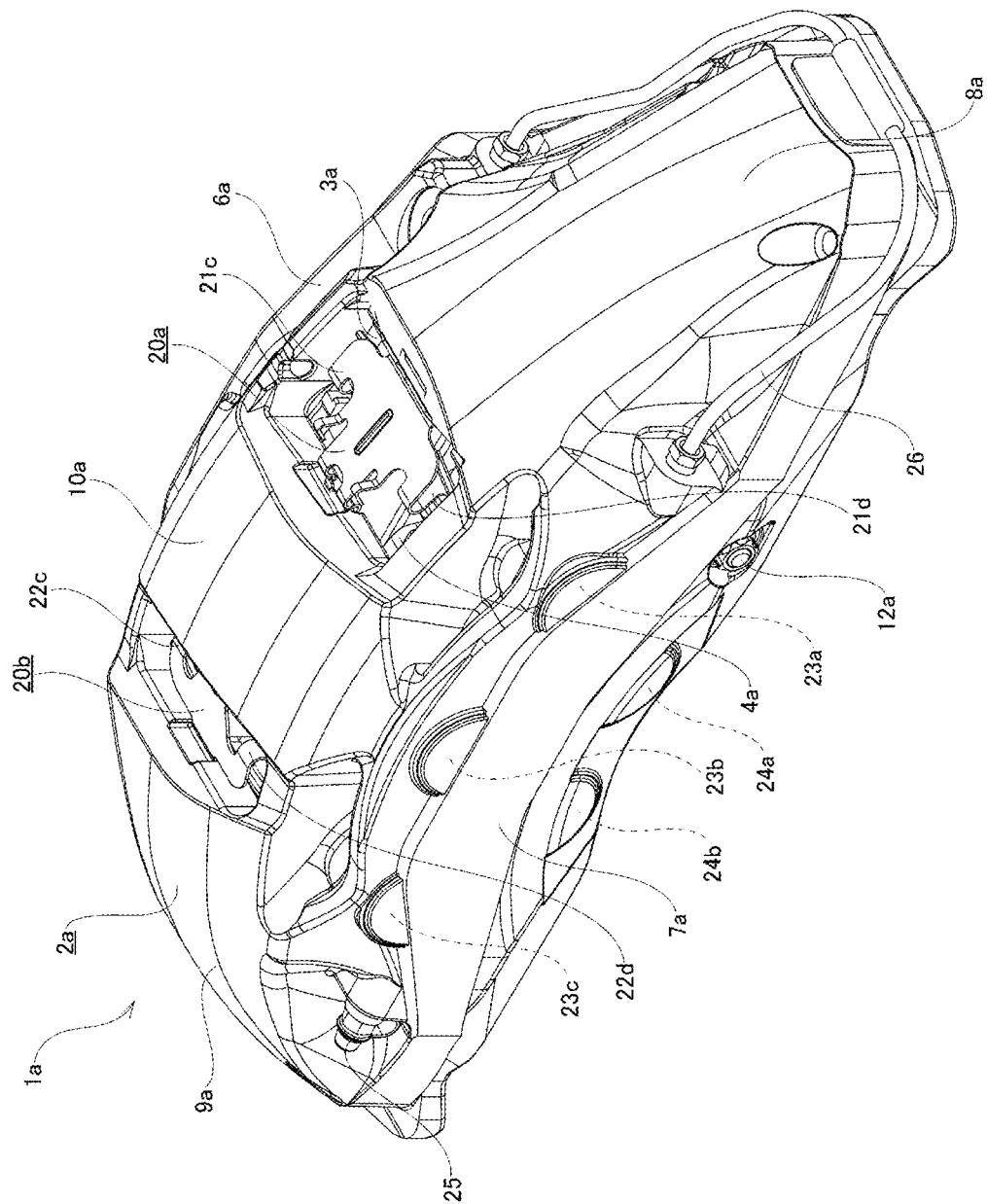
FIG. 6 is a perspective view of the disc brake device according to the first example of the embodiment as viewed from a front side, a radially outer side and one side in a circumferential direction.

In this example, the axial direction, a circumferential direction and a radial direction refer to an axial direction, a circumferential direction and a radial direction of the disc-shaped rotor 5 that rotates together with wheels unless otherwise specified (see FIG. 2). A front-back direction in FIGS. 1, 4, 9, 10, 12 to 14, an upper-lower direction in FIGS. 2 and 3, a left-right direction in FIGS. 5 and 11 correspond to the axial direction, a side close to the rotor 5 in the axial direction refers to an axially inner side, and a side far from the rotor 5 in the axial direction refers to an axially outer side. In addition, a left-right direction in FIGS. 1 to 4, 9, 10, 12 to 14, and a front-back direction in FIGS. 5 and 11 correspond to the circumferential direction, a right side in FIGS. 1 to 3, 9, 10 and 12, a left side in FIGS. 4, 13 and 14, and a back side in FIGS. 5 and 11 refer to one side in the circumferential direction, and a left side in FIGS. 1 to 3, 9, 10 and 12, a right side in FIGS. 4, 13 and 14, and a front side in FIGS. 5 and 11 refer to the other side in the circumferential direction. In this example, the one side in the circumferential direction corresponds to a rotation-in side when a vehicle is moving forward and a rotation-out side when the vehicle is moving reversely, and the other side in the circumferential direction corresponds to a rotation-out side when the vehicle is moving forward and a rotation-in side when the vehicle is moving reversely. In addition, an upper-lower direction in FIGS. 1, 4, 5, 9 to 14, and a front-back direction in FIGS. 2 and 3 correspond to the radial direction, an upper side in FIGS. 1, 4, 5, 9 to 14, a front side in FIG. 2, and a back side in FIG. 3 correspond to a radially outer side, and a lower side in FIGS. 1, 4, 5, 9 to 14, a back side in FIG. 2, and a front side in FIG. 3 correspond to a radially inner side. The rotation-in side refers to a side where the rotor 5 enters the caliper 2a, and the rotation-out side refers to a side where the rotor 5 exits from the caliper 2a.

[Caliper]

The caliper 2a has a substantially bow shape as viewed in the axial direction. The caliper 2a is fixed to a vehicle body and movably supports the inner pad 3a and the outer pad 4a in the axial direction. The caliper 2a is arranged so as to cover a part of the rotor 5 in the circumferential direction from the radially outer side, and is supported and fixed to a knuckle constituting a suspension device. The caliper 2a is integrally molded by casting a material made of light alloy such as aluminum alloy, or iron-based alloy. The caliper 2a includes an inner body 6a, an outer body 7a, a rotation-in side coupling portion 8a, a rotation-out side coupling portion 9a, and an intermediate coupling portion 10a.

The inner body 6a and the outer body 7a are arranged on both sides of the rotor 5 in the axial direction so as to sandwich the rotor 5. The inner body 6a is arranged on a widthwise inner side (a center side) of the vehicle with respect to the rotor 5, and the outer body 7a is arranged on a widthwise outer side of the vehicle with respect to the rotor 5. Each of the rotation-in side coupling portion 8a and the rotation-out side coupling portion 9a couples end portions of the inner body 6a and the outer body 7a on both sides of the circumferential direction to each other in the axial direction. The rotation-in side coupling portion 8a couples the end portions of the inner body 6a and the outer body 7a on the one side in the circumferential direction (the rotation-in side) to each other in the axial direction, and the rotation-out side coupling portion 9a couples the end portions of the inner body 6a and the outer body 7a on the other side in the circumferential direction (the rotation-out side) to each other in the axial direction. The intermediate coupling portion 10a couples intermediate portions of the inner body 6a and the outer body 7a in the circumferential direction to each other in the axial direction.

Each of the inner body 6a and the outer body 7a has five cylinders. Specifically, each of the inner body 6a and the outer body 7a includes three radially outer side cylinders 23a, 23b, 23c arranged in a radially outer side portion, and two radially inner side cylinders 24a, 24b arranged in a radially inner side portion. The five cylinders 23a, 23b, 23c, 24a, 24b provided in the inner body 6a and the five cylinders 23a, 23b, 23c, 24a, 24b provided in the outer body 7a are arranged to face each other in the axial direction. In the shown example, cylinder diameters of the five cylinders 23a, 23b, 23c, 24a, 24b are the same. However, when the present invention is carried out, the cylinder diameters may be different from each other, for example, a diameter of the cylinder arranged on the rotation-out side is larger than a diameter of the cylinder arranged on the rotation-in side.

The three radially outer side cylinders 23a, 23b, 23c and the two radially inner side cylinders 24a, 24b are alternately arranged in the circumferential direction. Specifically, the radially outer side cylinder 23a, the radially inner side cylinder 24a, the radially outer side cylinder 23b, the radially inner side cylinder 24b, and the radially outer side cylinder 23c are arranged in this order from the one side in the circumferential direction toward the other side in the circumferential direction. Therefore, the radially outer side cylinder 23a is arranged at an end portion on the rotation-in side, the radially outer side cylinder 23c is arranged at an end portion on the rotation-out side, and the radially outer side cylinder 23b is arranged at a central portion.

Centers of the respective three radially outer side cylinders 23a, 23b, 23c are arranged on the same virtual circle centered on a center of the rotor 5. Centers of the respective two radially inner side cylinders 24a, 24b are arranged on the same virtual circle centered on the center of the rotor 5. Among the three radially outer side cylinders 23a, 23b, 23c, the center of the radially outer side cylinder 23b arranged at the central portion may be arranged on the radially inner side with respect to the centers of the two radially outer side cylinders 23a, 23c arranged at the end portions on both sides in the circumferential direction.

Each of the inner body 6a and the outer body 7a has an oil passage hole (not shown) extending in the circumferential direction to supply and discharge brake oil (pressure oil) to a deep portion of each of the five cylinders 23a, 23b, 23c, 24a, 24b. The oil passage hole opens at the deep portion of each of the five cylinders 23a, 23b, 23c, 24a, 24b. An end portion of the oil passage hole on the other side in the circumferential direction is closed by a bleeder screw 25, and an end portion of the oil passage hole on the one side in the circumferential direction is connected to a communication pipe 26. A part of an outer shape of each of the cylinders 23a, 23b, 23c, 24a, 24b having a bottomed cylindrical shape appears on each axially outer side surface of the outer body 7a.

The inner body 6a includes a pair of attachment boss portions 32. The pair of attachment boss portions 32 are arranged on both sides of the five cylinders 23a, 23b, 23c, 24a, 24b in the circumferential direction. A bolt insertion hole 33 penetrating in the radial direction is formed in each of the attachment boss portions 32. The caliper 2a is fixed to the knuckle constituting the suspension device of a vehicle body directly or via an adapter (not shown) by using a bolt (not shown) inserted through the bolt insertion hole 33 from the radially outer side. Therefore, an end surface of each of the attachment boss portions 32 on the radially inner side functions as a seating surface, and the caliper 2a according to this example is a radial mount type caliper.

In the disc brake device 1, in an assembled state, the inner pad 3a and the outer pad 4a, which are arranged on both sides of the rotor 5 in the axial direction so as to sandwich the rotor 5, are supported so as to be movable in the axial direction with respect to the inner body 6a and the outer body 7a. For this purpose, each of the inner body 6a and the outer body 7a includes a pin 12a and a guide recessed groove 13a.

The pin 12a is provided on a radially inner side portion of one side portion of each of the inner body 6a and the outer body 7a in the circumferential direction, and is arranged parallel to a central axis of the rotor 5. The pin 12a is supported by and fixed to each of the inner body 6a and the outer body 7a. The pair of pins 12a respectively supported by and fixed to the inner body 6a and the outer body 7a are arranged coaxially with each other. A tip end portion of each of the pair of pins 12a protrudes in the axial direction from an axially inner side surface of each of the inner body 6a and the outer body 7a, and faces a side surface of the rotor 5 in the axial direction with a gap therebetween. The tip end portion of each of the pair of pins 12a has a substantially cylindrical shape, and has a cylindrical outer circumferential surface shape. In this example, a bolt having a cylindrical head portion is inserted from the axially inner side into a through hole penetrating the radially inner side portion of the one side portion of each of the inner body 6a and the outer body 7a in the circumferential direction, and a nut is screwed to a tip end portion of the bolt protruding from the hole, thereby forming the pin 12a by the head portion of the bolt. However, when the present invention is carried out, the pin may be integrally provided with the inner body and the outer body.

Figure 7:
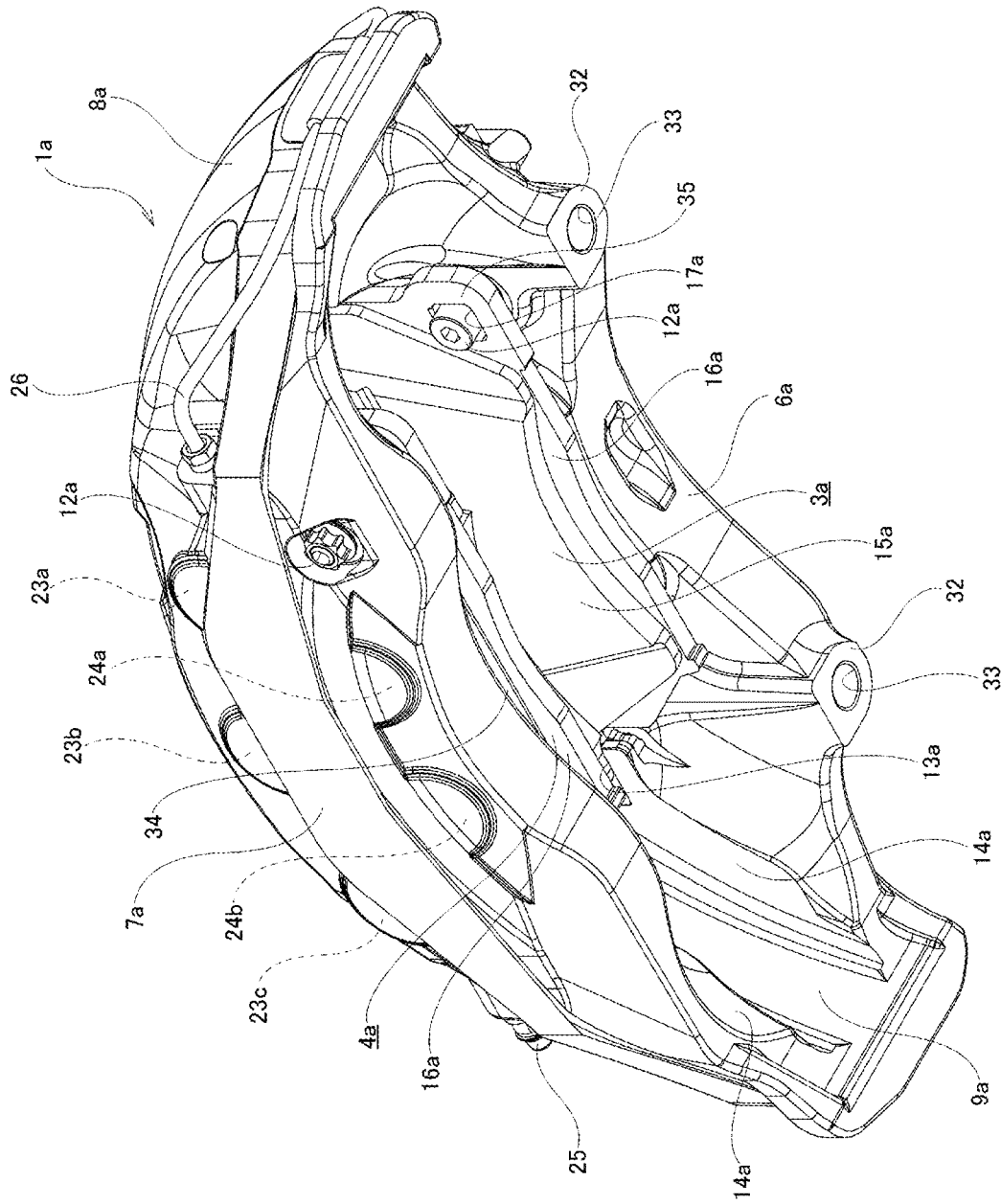
FIG. 7 is a perspective view of the disc brake device according to the first example of the embodiment as viewed from the front side, a radially inner side and the one side in the circumferential direction.
Figure 8:
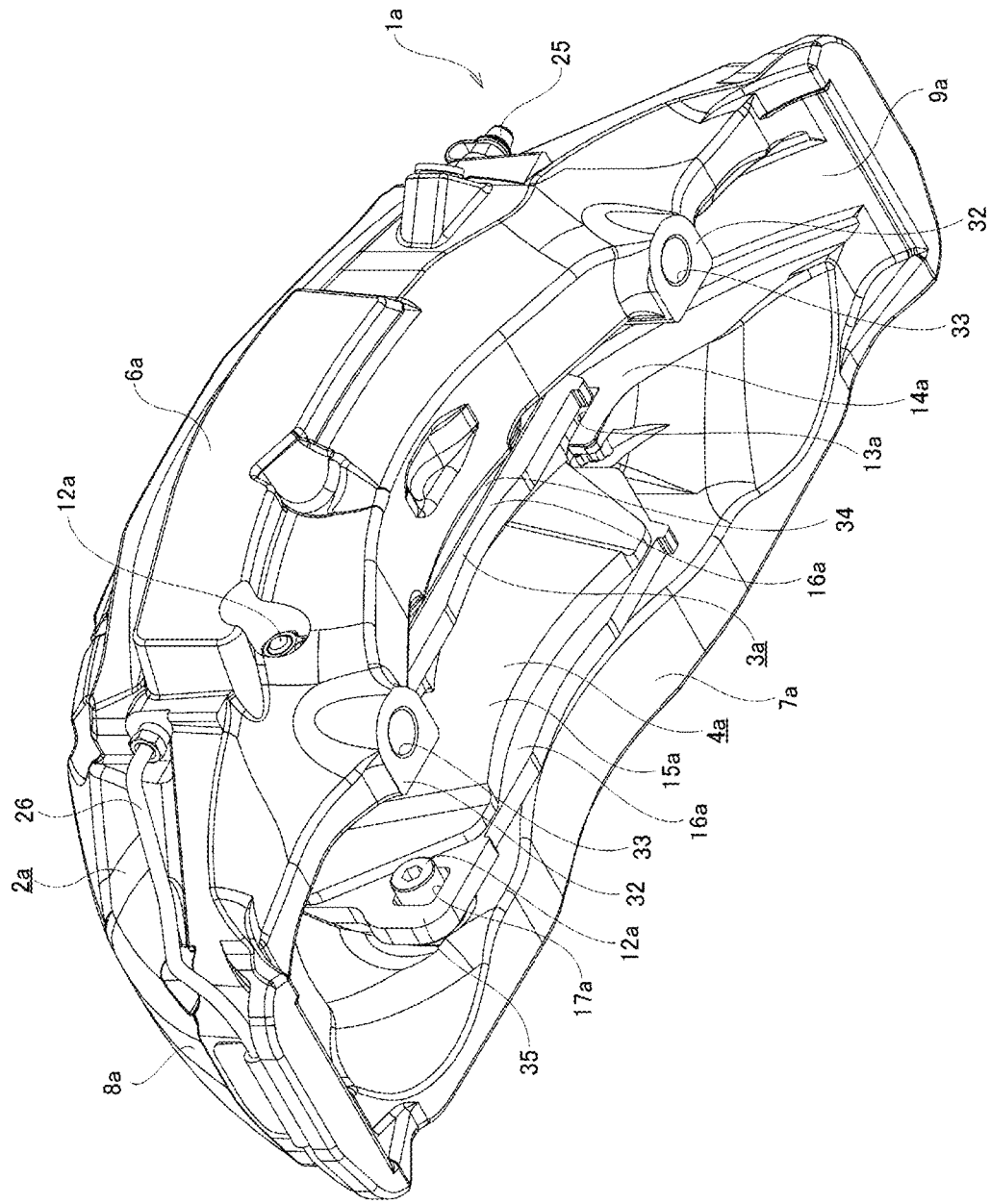
FIG. 8 is a perspective view of the disc brake device according to the first example of the embodiment as viewed from a rear side, the radially inner side and the one side in the circumferential direction.
Figure 9:
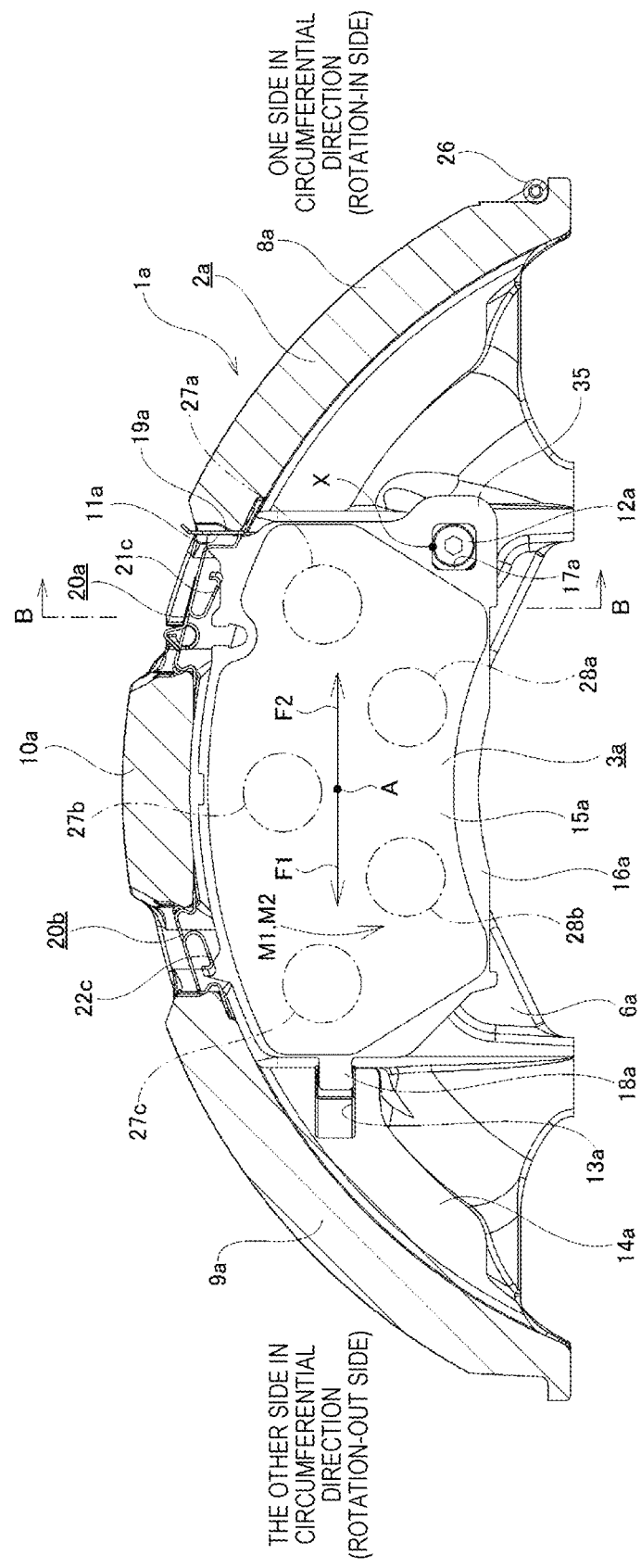
FIG. 9 is a cross-sectional view taken along a line A-A in FIG. 2.
Figure 10:
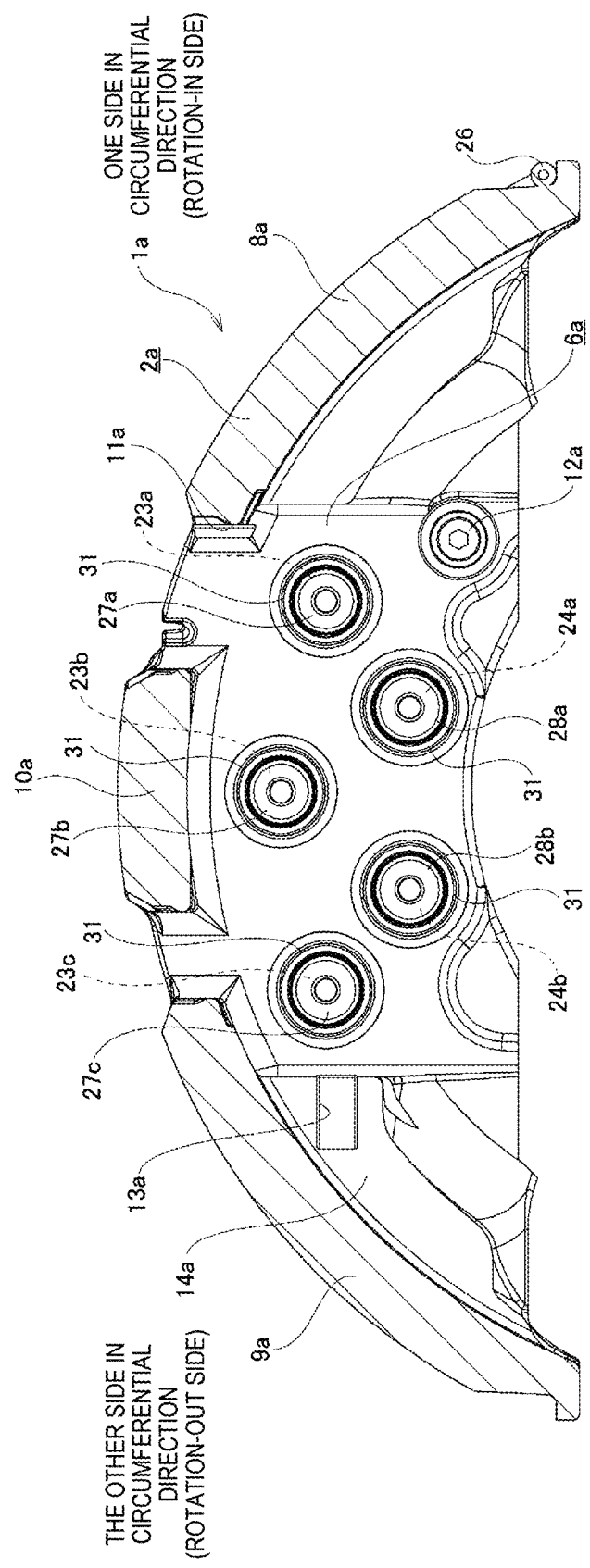
FIG. 10 is a view showing an inner pad omitted from FIG. 9.

As shown in FIGS. 7 to 9, the guide recessed groove 13a is provided in a guide wall portion 14a provided on the axially inner side portion of the other portion of each of the inner body 6a and the outer body 7a in the circumferential direction so as to protrude in the axial direction. The guide recessed groove 13a is provided in a radially intermediate portion of the guide wall portion 14a, and is open on an axially inner side surface of the guide wall portion 14a and a side surface on one side of the guide wall portion 14a in the circumferential direction.

Each of the rotation-in side coupling portion 8a and the rotation-out side coupling portion 9a is arranged on the radially outer side of the rotor 5, and couples the end portions of the inner body 6a and the outer body 7a in the circumferential direction to each other in the axial direction. The rotation-in side coupling portion 8a couples the end portions of the inner body 6a and the outer body 7a on the one side in the circumferential direction (the rotation-in side) to each other in the axial direction, and the rotation-out side coupling portion 9a couples the end portions of the inner body 6a and the outer body 7a on the other side in the circumferential direction (the rotation-out side) to each other in the axial direction. The rotation-in side coupling portion 8a and the rotation-out side coupling portion 9a are curved in an arc shape along an outer peripheral edge of the rotor 5, and cover the rotor 5 from the radially outer side via a predetermined gap. The rotation-in side coupling portion 8a has a flat surface-shaped abutted surface 11a at a portion facing the intermediate coupling portion 10a in the circumferential direction. The abutted surface 11a is formed on a virtual plane that is orthogonal to a brake tangential force.

The intermediate coupling portion 10a is arranged on the radially outer side of the rotor 5, and couples the intermediate portions of the inner body 6a and the outer body 7a in the circumferential direction to each other in the axial direction.

[Piston]

As described above, in the disc brake device 1a according to this example, each of the inner body 6a and the outer body 7a constituting the caliper 2a includes the three radially outer side cylinders 23a, 23b, 23c and the two radially inner side cylinders 24a, 24b. The radially outer side pistons 27a, 27b, 27c are respectively fitted to the three radially outer side cylinders 23a, 23b, 23c one by one so as to be displaceable in the axial direction. The radially inner side pistons 28a, 28b are respectively fitted to the two radially inner side cylinders 24a, 24b one by one so as to be displaceable in the axial direction. Therefore, the disc brake device 1a according to this example provides five pistons for each of the inner body 6a and the outer body 7a, and ten pistons in total.

Figure 11:
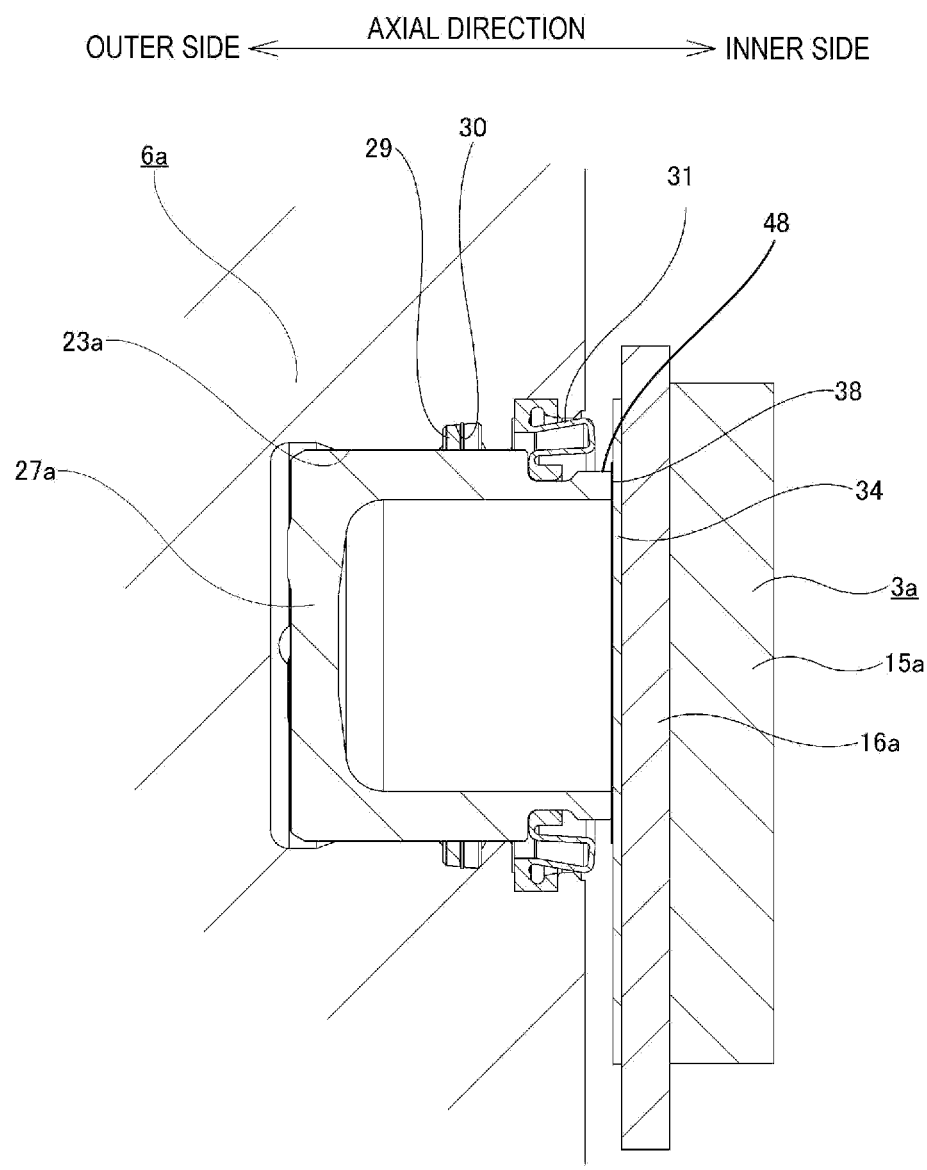
FIG. 11 is a schematic cross-sectional view taken along a line B-B in FIG. 9.

As shown in FIG. 11, the three radially outer side pistons 27a, 27b, 27c and the two radially inner side pistons 28a, 28b are each formed in a substantially bottomed cylindrical shape, and bottom portions thereof are arranged toward the deep portions of the radially outer side cylinders 23a, 23b, 23c and the radially inner side cylinders 24a, 24b, respectively. That is, the radially outer side pistons 27a, 27b, 27c and the radially inner side pistons 28a, 28b are arranged such that the circular plate-shaped bottom portion faces the axially outer side (an anti-rotor side), and an annular tip end portion 48 faces the axially inner side (a rotor side).

A piston seal 29 is sandwiched between an outer circumferential surface of each of the radially outer side pistons 27a, 27b, 27c and the radially inner side pistons 28a, 28b, and an inner circumferential surface of each of the radially outer side cylinders 23a, 23b, 23c and the radially inner side cylinders 24a, 24b. The piston seal 29 is mounted in a seal groove 30 formed on the inner circumferential surface of each of the radially outer side cylinders 23a, 23b, 23c and the radially inner side cylinders 24a, 24b. A dust cover 31 is bridged between the tip end portion 48 of each of the radially outer side pistons 27a, 27b, 27c and the radially inner side pistons 28a, 28b, and an opening edge portion of each of the radially outer side cylinders 23a, 23b, and 23c and the radially inner side cylinders 24a, 24b.

[Inner Pad and Outer Pad]

Figure 12:
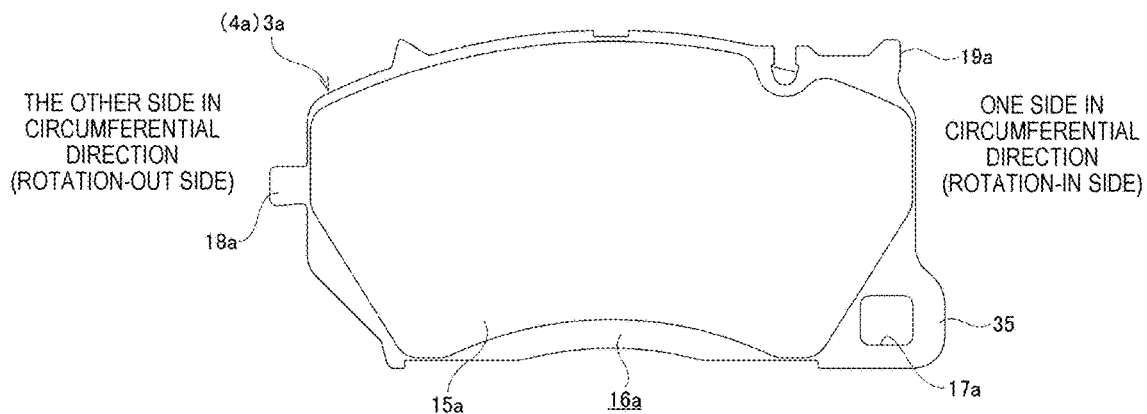
FIG. 12 is a front view showing a pad taken out.
Figure 13:
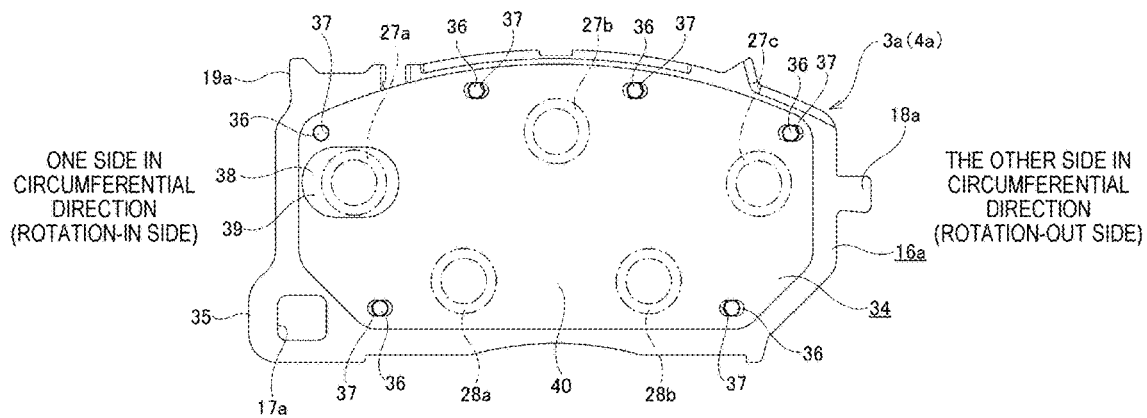
FIG. 13 is a rear view showing the pad taken out.
Figure 14:
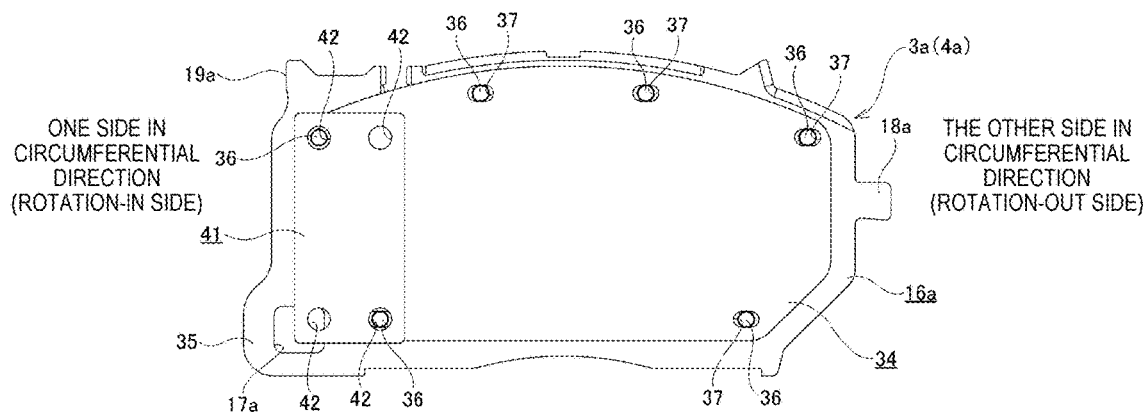
FIG. 14 is a rear view showing the pad before a release paper is peeled off.

As shown in FIGS. 12 to 14, each of the inner pad 3a and the outer pad 4a includes a lining (a friction material) 15a, a metal back plate (a pressure plate) 16a and a shim plate 34. The lining 15a is supported on a surface of the back plate 16a facing the rotor 5 among both side surfaces of the back plate 16a in the axial direction. Among both side surfaces of the back plate 16a in the axial direction, a surface facing a side opposite to the rotor 5 (an axially outer side surface) is referred to as a back surface of the back plate 16a. The inner pad 3a and the outer pad 4a have a symmetrical shape with respect to the axial direction.

The back plate 16a of each of the inner pad 3a and the outer pad 4a has a substantially triangular plate-shaped protruding portion 35 protruding in the circumferential direction from the lining 15a, at a radially inner side portion of an end portion on the one side in the circumferential direction (a rotation-in side end portion). The protruding portion 35 is located on the radially inner side with respect to a line of action of the brake tangential force that acts during braking (a point A at a friction surface center, see FIG. 9). An insertion hole 17a penetrating the protruding portion 35 in the axial direction is provided at a substantially central portion of the protruding portion 35. The insertion hole 17a corresponds to a slide engagement portion.

The insertion hole 17a is formed in a substantially rectangular shape as viewed in the axial direction, and opens only on both sides of the back plate 16a (protruding portion 35) in the axial direction. The pin 12a provided in each of the inner body 6a and the outer body 7a is loosely inserted inside the insertion hole 17a. Thereby, the insertion hole 17a is movably engaged with the pin 12a in the axial direction. When a central axis of the insertion hole 17a and a central axis of the pin 12a coincide with each other, a gap is formed between a cylindrical outer circumferential surface of the pin 12a and each of four side surfaces (a radially outer side surface, a radially inner side surface, a side surface on the one side in the circumferential direction and a side surface on the other side in the circumferential direction) constituting an inner peripheral surface of the insertion hole 17a. In the shown example, the shape of the insertion hole 17a as viewed from the axial direction is a substantially square shape having the same length on four sides.

The back plate 16a has a flat surface-shaped abutting surface 19a facing the abutted surface 11a in the circumferential direction, at a radially outer side end portion of a side surface on the one side in the circumferential direction, the end portion being located on the radially outer side with respect to the line of action of the brake tangential force that acts during braking.

The back plate 16a has a protruding lug portion (an engagement protruding portion) 18a protruding toward the other side in the circumferential direction, at a radially intermediate portion of the other side portion in the circumferential direction. The lug portion 18a corresponds to a slide engagement portion, and is engaged with the guide recessed groove 13a provided in each of the inner body 6a and the outer body 7a so as to be movable in the axial direction. Therefore, in this example, forms of the pair of slide engagement portions provided on both side portions of the back plate 16a in the circumferential direction are different from each other.

The back plate 16a has a plurality of (six in the shown example) protrusions (dowels) 36 protruding in the axial direction at portions near an outer peripheral edge of the back surface. Each of the protrusions 36 is formed in a substantially cylindrical shape.

The shim plate 34 is for suppressing brake squeal and uneven wear of the lining 15a due to vibration of the inner pad 3a and the outer pad 4a, and is attached to the back plate 16a so as to cover the back surface of the back plate 16a.

The shim plate 34 is made of a metal plate such as a stainless steel plate, and is formed in a flat plate shape. The shim plate 34 has a plurality of (six in the shown example) attachment holes 37 at portions near an outer peripheral edge. The attachment hole 37 has an elliptical shape having a circumferential width larger than a radial width. The protrusion 36 provided on the back surface of the back plate 16a is inserted into each of the attachment holes 37. Thereby, the shim plate 34 is supported by the back plate 16a so as to be capable of relative displacement in the circumferential direction and to be incapable of relative displacement in the radial direction. A caulking portion is formed at a tip end portion of each of the protrusions 36 while the protrusion 36 is inserted into the attachment hole 37. This prevents the shim plate 34 from falling off from the back plate 16a in the axial direction.

As shown in FIGS. 7 to 9, each of the inner pad 3a and the outer pad 4a is supported by the caliper 2a so as to be movable in the axial direction by inserting the pin 12a provided in the inner body 6a and the outer body 7a into the insertion hole 17a provided in one side portion of the back plate 16a in the circumferential direction and engaging the lug portion 18a provided on the other side portion of the back plate 16a in the circumferential direction with the guide recessed groove 13a provided in the inner body 6a and the outer body 7a. When the inner pad 3a and the outer pad 4a are supported by the caliper 2a, the abutting surface 19a provided on the side surface on the one side in the circumferential direction of the back plate 16a faces the abutted surface 11a provided in the rotation-in side coupling portion 8a in the circumferential direction.

[Pad Spring]

Figure 24:
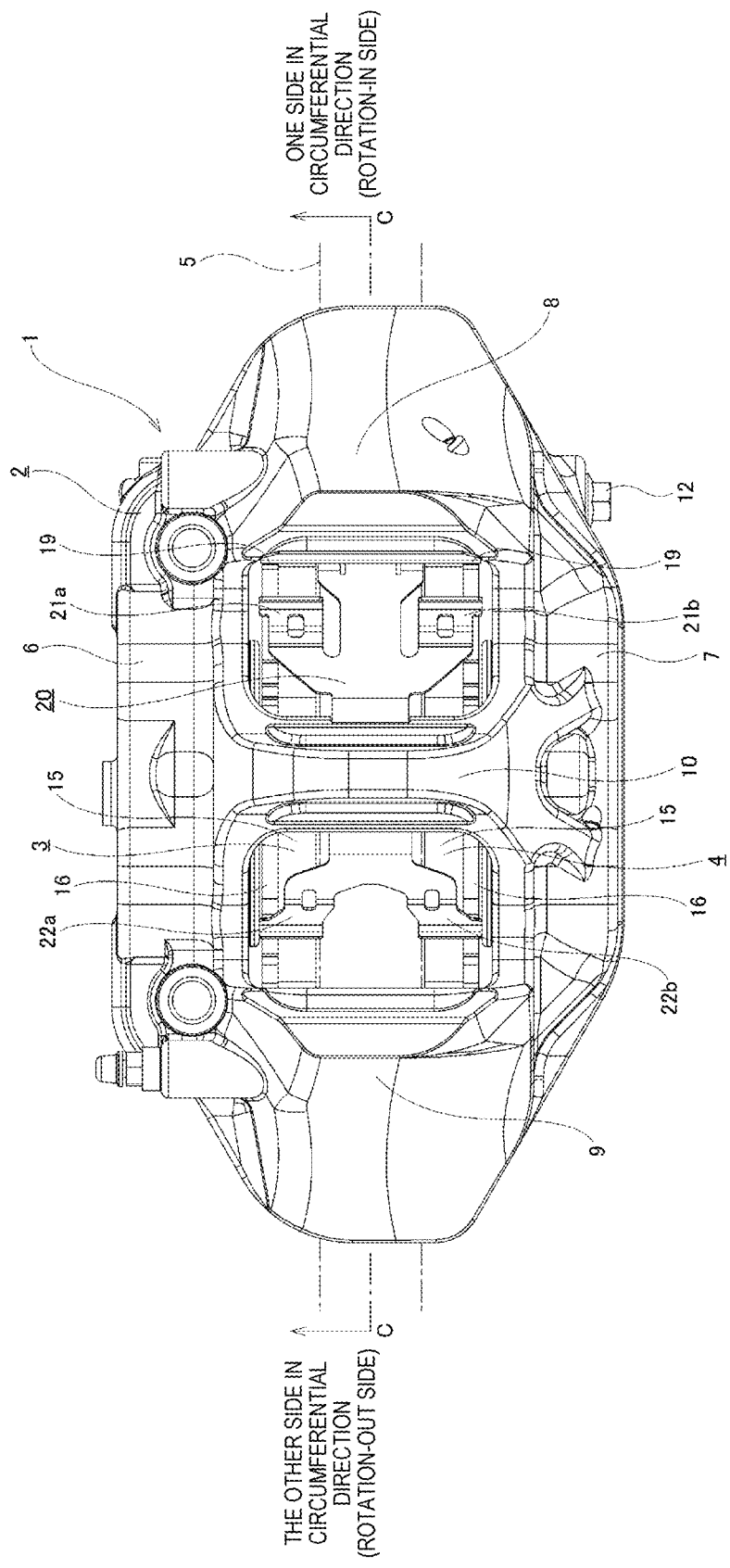
FIG. 24 is a plan view showing a related-art disc brake device.
Figure 25:
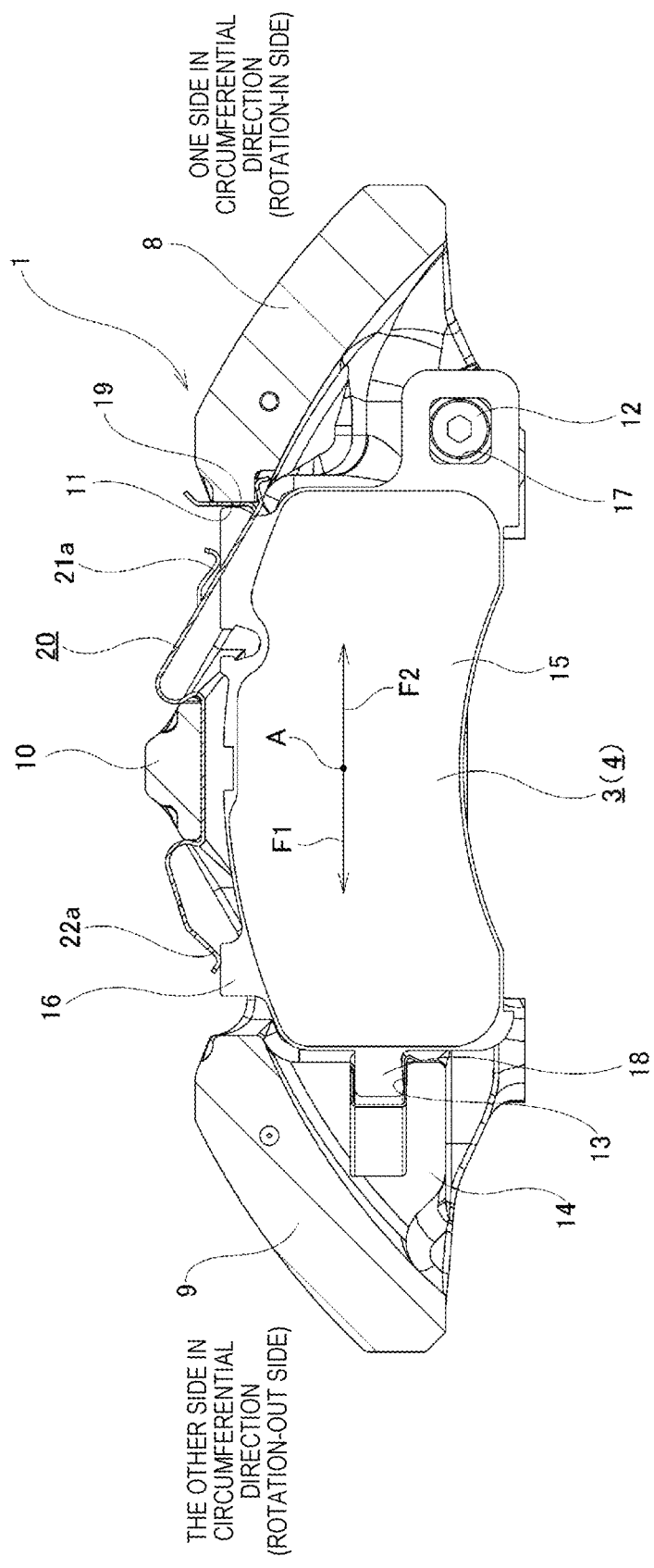
FIG. 25 is a cross-sectional view taken along a line C-C in FIG. 24.

The disc brake device 1a according to this example further includes a pair of pad springs 20a, 20b to prevent occurrence of rattling of the inner pad 3a and the outer pad 4a during non-braking. When the present invention is carried out, a structure in which the pair of pad springs 20a, 20b are integrated as in a structure shown in FIG. 24 is adopted.

The pad spring 20a presses one side portion of a radially outer side edge portion of the back plate 16a in the circumferential direction of each of the inner pad 3a and the outer pad 4a toward the radially inner side. The pad spring 20a is arranged on the radially outer side of the inner pad 3a and the outer pad 4a and between the rotation-in side coupling portion 8a and the intermediate coupling portion 10a in the circumferential direction. The pad spring 20a is made of a metal plate and includes a pair of rotation-in side pressing portions 21c, 21d. The pair of rotation-in side pressing portions 21c, 21d press the radially outer side edge portion of the back plate 16a of each of the inner pad 3a and the outer pad 4a toward the radially inner side, and toward the axially outer side and the other side in the circumferential direction.

The pad spring 20b presses the other side portion of the radially outer side edge portion of the back plate 16a in the circumferential direction of each of the inner pad 3a and the outer pad 4a toward the radially inner side. The pad spring 20b is arranged on the radially outer side of the inner pad 3a and the outer pad 4a and between the rotation-out side coupling portion 9a and the intermediate coupling portion 10a in the circumferential direction. The pad spring 20b is made of a metal plate and includes a pair of rotation-out side pressing portions 22c, 22d. The pair of rotation-out side pressing portions 22c, 22d press the other side portion of the radially outer side edge portion of the back plate 16a in the circumferential direction of each of the inner pad 3a and the outer pad 4a toward the radially inner side.

[Moment Acting During Braking]

The disc brake device 1a according to this example generates a moment similar to that in the structure shown in FIGS. 24 to 26B described above, in each of the inner pad 3a and the outer pad 4a during braking.

During forward braking, as shown in FIG. 9, a brake tangential force F1 directed to the other side in the circumferential direction (a left side in FIG. 9 and the rotation-out side) acts on the point A at the friction surface center of the lining 15a of the inner pad 3a (the outer pad 4a). Thereby, the side surface in the inner peripheral surface of the insertion hole 17a on the one side in the circumferential direction and an end portion of the outer circumferential surface of the pin 12a on the one side in the circumferential direction are engaged to support the brake tangential force F1 (a so-called pull anchor structure). Therefore, during the forward braking, a moment M1 in a direction in which the other side portion in the circumferential direction is pushed down to the radially inner side acts on the inner pad 3a and the outer pad 4a. The point A at the friction surface center is a centroid of a friction surface, and is determined by a diameter, arrangement and the like of the piston.

During reverse braking, a brake tangential force F2 directed to the one side in the circumferential direction (a right side in FIG. 9 and the rotation-in side) acts on the point A at the friction surface center of the lining 15a of the inner pad 3a (the outer pad 4a). Thereby, the abutting surface 19a and the abutted surface 11a abut against each other to support the brake tangential force F2 (a so-called push anchor structure). Therefore, during the reverse braking, a moment M2 in a direction in which the other side portion in the circumferential direction is pushed down to the radially inner side (a direction the same as the moment M1) acts on the inner pad 3a and the outer pad 4a.

Therefore, according to the disc brake device 1a of this example, the directions of the moments M1, M2 acting on the inner pad 3a and the outer pad 4a can match during the forward braking and the reverse braking. Therefore, for example, even when the forward braking and the reverse braking are repeated as in a case of a garage parking, a posture of each of the inner pad 3a and the outer pad 4a can be maintained in a state of being rotated counterclockwise. Therefore, occurrence of a clunk noise can be prevented.

However, during the forward braking and the reverse braking, a gap is likely to be formed between the radially outer side surface in the inner peripheral surface of the insertion hole 17a located on the radially outer side and a radially outer side end portion of the outer circumferential surface of the pin 12a due to the moments M1, M2 acting on the inner pad 3a and the outer pad 4a. Therefore, unless some measures are taken, when a braking force is released, the radially outer side surface in the inner peripheral surface of the insertion hole 17a collides with the radially outer side end portion of the outer circumferential surface of the pin 12a vigorously due to a pressing force of the pad spring 20a, and thus the clunk noise is likely to occur.

Therefore, in this example, the following measures are taken to prevent the occurrence of the clunk noise due to the radially outer side surface in the inner peripheral surface of the insertion hole 17a colliding with the radially outer side end portion of the outer circumferential surface of the pin 12a vigorously when the braking force is released.

[Structure of Preventing Occurrence of Clunk Noise]

In this example, in order to prevent the occurrence of the clunk noise, the posture of each of the inner pad 3a and the outer pad 4a is regulated by using at least one or more pistons among the five pistons 27a, 27b, 27c, 28a, 28b that press the inner pad 3a and the outer pad 4a toward the rotor 5 in the axial direction. That is, the posture of each of the inner pad 3a and the outer pad 4a is less likely to change using the piston.

Specifically, the inner pad 3a and the outer pad 4a are fixed only to the tip end portion of the radially outer side piston 27a arranged at the end portion on the rotation-in side, among the five pistons 27a, 27b, 27c, 28a, 28b. Among the five pistons 27a, 27b, 27c, 28a, 28b, the tip end portions 48 of the four pistons 27b, 27c, 28a, 28b, which are the remaining pistons, are not fixed to each of the inner pad 3a and the outer pad 4a.

In this example, each of the inner pad 3a and the outer pad 4a includes the lining 15a, the back plate 16a and the shim plate 34. Therefore, only the tip end portion 48 of the radially outer side piston 27a arranged at the end portion on the rotation-in side fixed to a back surface of the shim plate 34, which is an axially outer side surface thereof.

In this example, the back surface of the shim plate 34 of each of the inner pad 3a and the outer pad 4a is adhesively fixed to the tip end portion 48 of the radially outer side piston 27a arranged at the end portion on the rotation-in side by an adhesive 38. The adhesive 38 may be a pressure sensitive adhesive.

For this purpose, before each of the inner pad 3a and the outer pad 4a is assembled into the caliper 2a, an adhesive surface 39 and a non-adhesive surface 40 are provided in advance on the back surface of the shim plate 34 as shown in FIG. 13. Specifically, a sheet-shaped adhesive 38 having adhesive surfaces on both surfaces is attached to a portion of the back surface of the shim plate 34 serving as an adherend, where the tip end portion 48 of the radially outer side piston 27a is in contact, and the adhesive surface 39 is provided in the portion. That is, the adhesive surface 39 is formed of the sheet-shaped adhesive 38 attached to the back surface of the shim plate 34. On the other hand, the adhesive 38 is not attached to a portion of the back surface of the shim plate 34 where the tip end portions 48 of the remaining four pistons 27b, 27c, 28a, 28b are in contact, and thus the portion is set as the non-adhesive surface 40 formed of the back surface of the shim plate 34. A portion of the back surface of the shim plate 34, which includes the portion where the tip end portions 48 of the four pistons 27b, 27c, 28a, 28b are in contact and is separated from the adhesive surface 39, is a non-adhesive surface 40.

The adhesive 38 is, for example, a so-called double-sided tape (an adhesive tape) provided with an acrylic adhesive layer on both surfaces of a support, and is formed to be thin (for example, 0.01 mm to several mm). The adhesive 38 has an elliptical shape slightly larger than a circular outer edge of the tip end portion 48 of the radially outer side piston 27a. The adhesive surface 39 formed of the adhesive 38 is covered with a release paper 41 as shown in FIG. 14 in a state before the tip end portion 48 of the radially outer side piston 27a is adhesively fixed. The release paper 41 has a rectangular shape sufficiently larger than the sheet-shaped adhesive 38, and has substantially circular engagement holes 42 at four corners thereof.

The protrusions 36 provided on the back surface of the back plate 16a are respectively inserted into the two engagement holes 42 arranged on a diagonal line, among the four engagement holes 42 provided in the release paper 41. Specifically, the protrusion 36 arranged at an end portion of the radially outer side portion on the one side in the circumferential direction is inserted into the engagement hole 42 arranged on the one side in the circumferential direction of the radially outer portion. The protrusion 36 arranged at an end portion of the radially inner side portion on the one side in the circumferential direction is inserted into the engagement hole 42 arranged on the other side in the circumferential direction of the radially inner portion. In this example, when the sheet-shaped adhesive 38 is attached to the back surface of the shim plate 34, the two protrusions 36 provided on the back plate 16a are inserted into the two engagement holes 42 provided in the release paper 41, thereby positioning the sheet-shaped adhesive 38 (the adhesive surface 39) with respect to the back plate 16a. The release paper 41 is peeled off from the adhesive 38 before the inner pad 3a and the outer pad 4a are assembled into the caliper 2a. Since a thickness of the sheet-shaped adhesive 38 is sufficiently small, the thickness of the adhesive 38 from the back surface of the shim plate 34 (a difference in height between the adhesive surface 39 and the non-adhesive surface 40) is sufficiently small.

After the adhesive surface 39 formed of the sheet-shaped adhesive 38 and the non-adhesive surface 40 formed of the back surface of the shim plate 34 are provided on the back surface of the shim plate 34, each of the inner pad 3a and the outer pad 4a is assembled into the caliper 2a. Thereafter, brake oil is fed to the five cylinders 23a, 23b, 23c, 24a, 24b provided in each of the inner body 6a and the outer body 7a, and the five pistons 27a, 27b, 27c, 28a, 28b are pushed out in the axial direction. Then, the tip end portion of the radially outer side piston 27a arranged at the end portion on the rotation-in side is pressed against the adhesive surface 39, and the tip end portions of the remaining four pistons 27b, 27c, 28a, 28b are pressed against the non-adhesive surface 40. Thereby, only the tip end portion of the radially outer side piston 27a at the end portion on the rotation-in side is adhesively fixed to the back surface of the shim plate 34 by the adhesive 38. The tip end portions of the remaining four pistons 27b, 27c, 28a, 28b are not adhesively fixed to the back surface of the shim plate 34.

When the tip end portion of the radially outer side piston 27a is adhesively fixed to the back surface of the shim plate 34, the posture (a position) of each of the inner pad 3a and the outer pad 4a with respect to the caliper 2a is regulated. Specifically, by using the pressing force of the pad spring 20a, the tip end portion of the radially outer side piston 27a is adhesively fixed to the back surface of the shim plate 34 in a state where the radially outer side surface in the inner peripheral surface of the insertion hole 17a and the radially outer side end portion of the outer circumferential surface of the pin 12a are in contact with each other, and the side surface in the inner peripheral surface of the insertion hole 17a on the one side in the circumferential direction and the end portion of the outer circumferential surface of the pin 12a on the one side in the circumferential direction are in contact with each other.

Also in a case of the disc brake device 1a according to this example as described above, during braking, the brake oil is fed from a master cylinder to the five cylinders 23a, 23b, 23c, 24a, 24b provided in each of the inner body 6a and the outer body 7a. Thereby, the five pistons 27a, 27b, 27c, 28a, 28b provided in each of the inner body 6a and the outer body 7a are pushed out in the axial direction, and the inner pad 3a and the outer pad 4a are pressed against both side surfaces of the rotor 5 in the axial direction. As a result, the rotor 5 is strongly sandwiched by the inner pad 3a and the outer pad 4a from both sides in the axial direction, and the vehicle is braked. During the braking, as described above, the moments M1, M2 in the same direction act on the inner pad 3a and the outer pad 4a in both the forward braking and the reverse braking.

According to the disc brake device 1a of this example as described above, the occurrence of the clunk noise can be prevented when the braking force is released.

That is, in this example, the shim plate 34 of each of the inner pad 3a and the outer pad 4a is adhesively fixed to the tip end portion 48 of the radially outer side piston 27a arranged at the end portion on the rotation-in side by the adhesive 38. Therefore, the posture of each of the inner pad 3a and the outer pad 4a can be regulated (stabilized) by the radially outer side piston 27a. Therefore, during the forward braking and the reverse braking, formation of the gap between the radially outer side surface in the inner peripheral surface of the insertion hole 17a and the radially outer side end portion of the outer circumferential surface of the pin 12a (an X portion in FIG. 9) can be prevented regardless of the moments M1, M2 acting on each of the inner pad 3a and the outer pad 4a. Therefore, when the braking force is released, the radially outer side surface in the inner peripheral surface of the insertion hole 17a can be prevented from vigorously colliding with the radially outer side end portion of the outer circumferential surface of the pin 12a due to the pressing force of the pad spring 20a. As a result, the occurrence of the clunk noise can be prevented when the braking force is released.

In particular, in this example, the shim plate 34 of each of the inner pad 3a and the outer pad 4a is adhesively fixed to the radially outer side piston 27a arranged at a position closest to the insertion hole 17a that causes the occurrence of the clunk noise, among the five pistons 27a, 27b, 27c, 28a, 28b. More specifically, the shim plate 34 of each of the inner pad 3a and the outer pad 4a is adhesively fixed to the radially outer side piston 27a having the shortest distance from a contact portion between the radially outer side surface in the inner peripheral surface of the insertion hole 17a and the radially outer side end portion of the outer circumferential surface of the pin 12a, which is a generation source of the clunk noise, among the five pistons 27a, 27b, 27c, 28a, 28b. Therefore, it is necessary to prevent the formation of the gap between the radially outer side surface in the inner peripheral surface of the insertion hole 17a and the radially outer side end portion of the outer circumferential surface of the pin 12a, so that an adhesive force between the back surface of the shim plate 34 and the tip end portion 48 of the radially outer side piston 27a can be suppressed to be small, and the posture of each of the inner pad 3a and the outer pad 4a can be effectively regulated. Therefore, the occurrence of the clunk noise can be sufficiently prevented when the braking force is released.

In addition, since the posture of each of the inner pad 3a and the outer pad 4a can be prevented from being unstable regardless of the moments M1, M2 acting during the braking, squeal performance can also be improved. In this example, since the shim plate 34 is attached to the back surface of the back plate 16a, the occurrence of the brake squeal and the uneven wear of the lining 15a due to the vibration of the inner pad 3a and the outer pad 4a during the braking can be suppressed.

When the braking force is released, the radially outer side piston 27a can separate each of the inner pad 3a and the outer pad 4a from the rotor 5 by using a force pulled back to a deep side of the radially outer side cylinder 23a by the piston seal 29. Therefore, dragging of the inner pad 3a and the outer pad 4a can be reduced.

The shim plate 34 of each of the inner pad 3a and the outer pad 4a is not adhesively fixed to the tip end portions 48 of all the five pistons 27a, 27b, 27c, 28a, 28b, but is adhesively fixed only to the tip end portion 48 of the radially outer side piston 27a arranged at the end portion on the rotation-in side. Therefore, a range (an area) of the adhesive surface 39 can be reduced to be small, and an amount of use of the adhesive 38 can be reduced to be small. Therefore, an increase in cost of the inner pad 3a and the outer pad 4a can be suppressed, and a cost of the disc brake device 1a can be reduced.

In this example, since the tip end portion 48 of the radially outer side piston 27a is adhesively fixed to the back surface of the shim plate 34 by using the adhesive 38, fixing work for the radially outer side piston 27a can be simplified as compared with a case where the radially outer side piston 27a is welding-fixed by welding, for example. In particular, in this example, since the sheet-shaped adhesive 38 is used, the adhesive surface 39 can be uniformly provided at a necessary position without requiring skill of an operator, as compared with a case where a liquid adhesive is used, for example. Since the adhesive 38 can be positioned with respect to the back plate 16a by using the engagement hole 42 provided in the release paper 41, the adhesive 38 can be attached to an appropriate position without using a dedicated jig. Therefore, the increase in cost of the inner pad 3a and the outer pad 4a can also be suppressed.

Second Example of Embodiment

Figure 15:
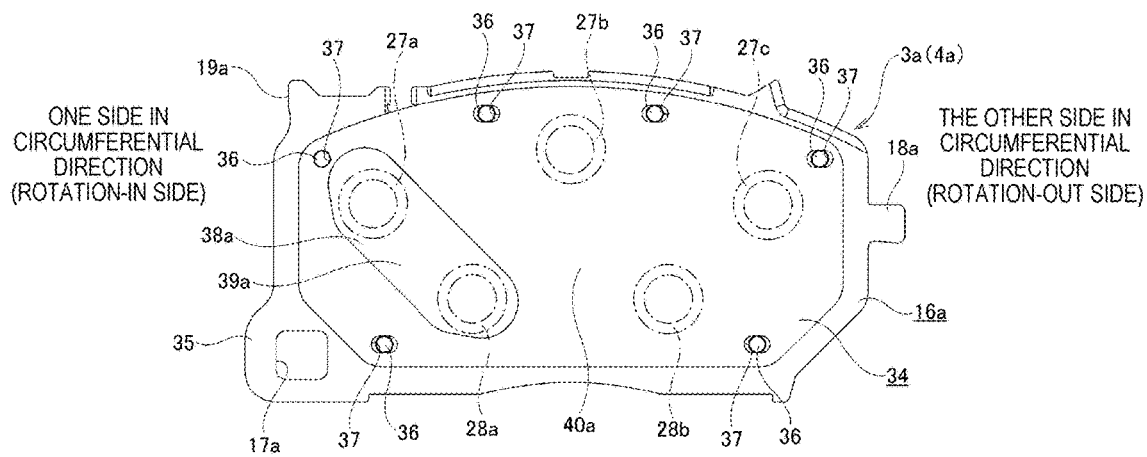
FIG. 15 is a view corresponding to FIG. 13, showing a second example of the embodiment.
Figure 16:
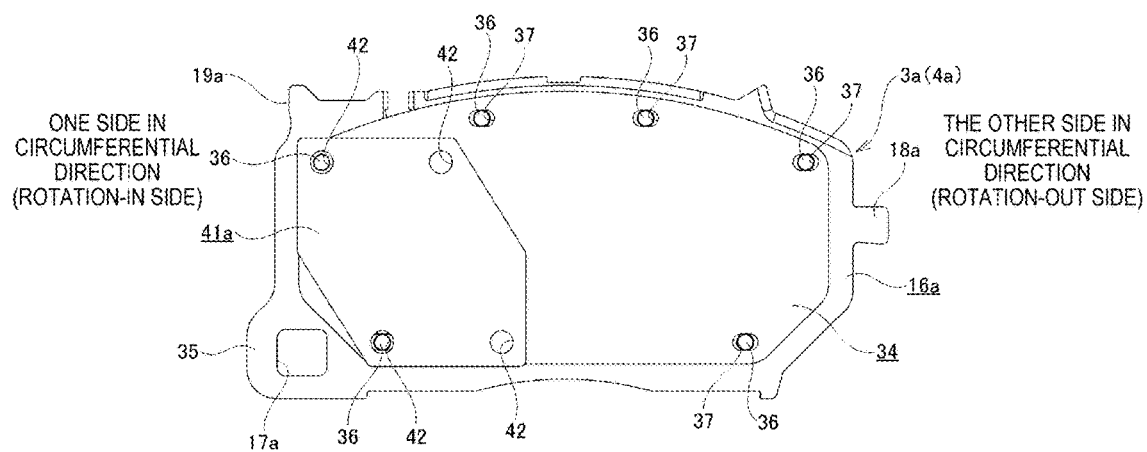
FIG. 16 is a view corresponding to FIG. 14, showing the second example of the embodiment.

A second example of the embodiment will be described with reference to FIGS. 15 to 16. In this example, the same components as those of the first example of the embodiment are denoted by the same reference numerals as those of the first example of the embodiment, and detailed description thereof is omitted.

In this example, the number of pistons adhesively fixed to the shim plate 34 of each of the inner pad 3a and the outer pad 4a is changed from a structure according to the first example of the embodiment.

That is, the shim plate 34 of each of the inner pad 3a and the outer pad 4a is adhesively fixed to the tip end portions 48 of the radially outer side piston 27a arranged at the end portion on the rotation-in side and the radially inner side piston 28a arranged adjacently on the other side in the circumferential direction of the outer diameter side piston 27a, among the five pistons 27a, 27b, 27c, 28a, 28b. On the other hand, the tip end portions 48 of the three pistons 27b, 27c, 28b, which are the remaining pistons among the five pistons 27a, 27b, 27c, 28a, 28b, are not fixed to the shim plate 34 of each of the inner pad 3a and the outer pad 4a. Therefore, only the tip end portions 48 of the two pistons 27a, 28a arranged on the one side in the circumferential direction are adhesively fixed to the shim plate 34 of each of the inner pad 3a and the outer pad 4a.

In this example, the tip end portions 48 of the radially outer side piston 27a and the radially inner side piston 28a are adhesively fixed to the back surface of the shim plate 34 using a single sheet-shaped adhesive 38a. The adhesive 38a is formed in a substantially elliptical shape having a size capable of covering the tip end portions 48 of the radially outer side piston 27a and the radially inner side piston 28a. An adhesive surface 39a formed of the adhesive 38a is covered with a release paper 41a in a state before the tip end portions 48 of the radially outer side piston 27a and the radially inner side piston 28a are adhesively fixed. The release paper 41a has a substantially hexagonal shape sufficiently larger than the sheet-shaped adhesive 38a, and has substantially circular engagement holes 42 at four corners thereof.

Two protrusions 36 provided on the back surface of the back plate 16a are respectively inserted into the two engagement holes 42 arranged on the one side in the circumferential direction, among the four engagement holes 42 provided in the release paper 41a. Specifically, the protrusion 36 arranged at the end portion of the radially outer side portion on the one side in the circumferential direction is inserted into the engagement hole 42 arranged on the one side in the circumferential direction of the radially outer portion. The protrusion 36 arranged at the end portion of the radially inner side portion on the one side in the circumferential direction is inserted into the engagement hole 42 arranged on the one side in the circumferential direction of the radially inner side portion. In this example, when the sheet-shaped adhesive 38a is attached to the back surface of the shim plate 34, the two protrusions 36 provided on the back plate 16a are inserted into the two engagement holes 42 provided in the release paper 41a, thereby positioning the sheet-shaped adhesive 38a (the adhesive surface 39a) with respect to the back plate 16a.

Each of the inner pad 3a and the outer pad 4a includes the substantially elliptical adhesive surface 39a formed by attaching the sheet-shaped adhesive 38a to a portion of the back surface of the shim plate 34 where the tip end portions 48 of the radially outer side piston 27a and the radially inner side piston 28a are in contact in a state before the inner pad 3a and the outer pad 4a are assembled into the caliper 2a (see FIG. 1). On the other hand, a non-adhesive surface 40a formed of the back surface of the shim plate 34a is provided at a portion of the back surface of the shim plate 34a, which is separated from the adhesive surface 39a and includes the portion where the tip end portions 48 of the three pistons 27b, 27c, 28b are in contact.

In this example as described above, the posture of each of the inner pad 3a and the outer pad 4a can be regulated by the two pistons including the radially outer side piston 27a and the radially inner side piston 28a. Therefore, during the forward braking and the reverse braking, the formation of the gap between the radially outer side surface in the inner peripheral surface of the insertion hole 17a and the radially outer side end portion of the outer circumferential surface of the pin 12a can be more effectively prevented. Therefore, the occurrence of the clunk noise can be more effectively prevented when the braking force is released.

Other configurations and operational effects are the same as those of the first example of the embodiment.

Third Example of Embodiment

Figure 17:
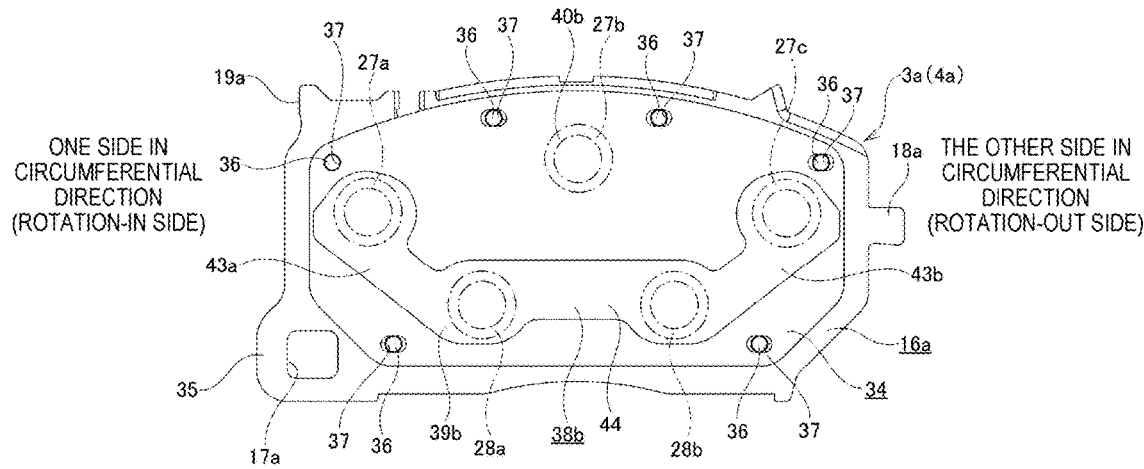
FIG. 17 is a view corresponding to FIG. 13, showing a third example of the embodiment.
Figure 18:
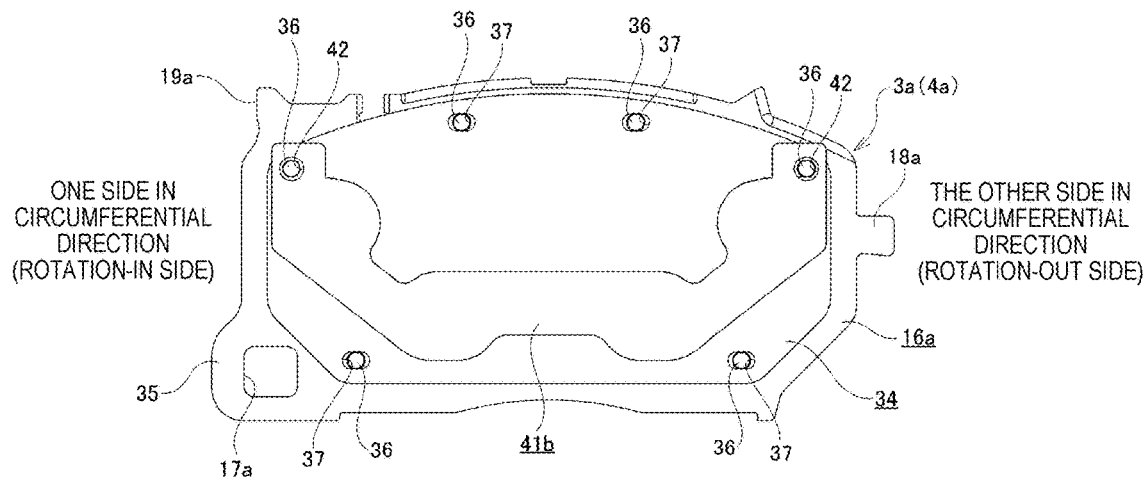
FIG. 18 is a view corresponding to FIG. 14, showing the third example of the embodiment.

A third example of the embodiment will be described with reference to FIGS. 17 to 18. In this example, the same components as those of the first example of the embodiment are denoted by the same reference numerals as those of the first example of the embodiment, and detailed description thereof is omitted.

In this example, the number of pistons adhesively fixed to the shim plate 34 of each of the inner pad 3a and the outer pad 4a is changed from structures according to the first example and the second example of the embodiment.

That is, the shim plate 34 of each of the inner pad 3a and the outer pad 4a is adhesively fixed to the tip end portions 48 of the radially outer side piston 27a arranged at the end portion on the rotation-in side, the radially inner side piston 28a arranged adjacently on the other side in the circumferential direction of the radially outer side piston 27a, the radially outer side piston 27c arranged at the end portion on the rotation-out side, and the radially inner side piston 28b arranged adjacently on the one side in the circumferential direction of the radially outer side piston 27c, among the five pistons 27a, 27b, 27c, 28a, 28b. On the other hand, the tip end portion 48 of the radially outer side piston 27b arranged at a central portion, which is the remaining piston among the five pistons 27a, 27b, 27c, 28a, 28b, is not fixed to the shim plate 34 of each of the inner pad 3a and the outer pad 4a. Therefore, the tip end portions 48 of the four pistons 27a, 27c, 28a, 28b, rather than the radially outer side piston 27b arranged at the central portion, are adhesively fixed to the shim plate 34 of each of the inner pad 3a and the outer pad 4a.

In this example, the tip end portions 48 of the four pistons 27a, 27c, 28a, 28b are adhesively fixed to the back surface of the shim plate 34 using a single sheet-shaped adhesive 38b. The adhesive 38b has a substantially U-shape as a whole, and has two main body portions 43a, 43b and a coupling portion 44.

The main body portion 43a has a substantially elliptical shape (a substantially rectangular shape) in which an intermediate portion is recessed, and has a size capable of covering the tip end portions 48 of the radially outer side piston 27a and the radially inner side piston 28a. The main body portion 43b has a substantially elliptical shape (a substantially rectangular shape) in which an intermediate portion is recessed, and has a size capable of covering the tip end portions 48 of the radially outer side piston 27c and the radially inner side piston 28b. The coupling portion 44 couples the two main body portions 43a, 43b in the circumferential direction. An adhesive surface 39b formed of the adhesive 38b is covered with a release paper 41b in a state before the tip end portions 48 of the four pistons 27a, 27c, 28a, 28b are adhesively fixed. The release paper 41b has a size substantially the same as that of the sheet-shaped adhesive 38b, and has two engagement holes 42 at a radially outer side portion.

The protrusion 36 arranged at the end portion of the radially outer side portion on the one side in the circumferential direction is inserted into the engagement hole 42 arranged on the one side in the circumferential direction, among the two engagement holes 42 provided in the release paper 41b. The protrusion 36 arranged at the end portion of the radially outer side portion on the other side in the circumferential direction is inserted into the engagement hole 42 arranged on the other side in the circumferential direction, among the two engagement holes 42 provided in the release paper 41b. In this example, when the sheet-shaped adhesive 38b is attached to the back surface of the shim plate 34, the two protrusions 36 provided on the back plate 16a are inserted into the two engagement holes 42 provided in the release paper 41b, thereby positioning the sheet-shaped adhesive 38b (the adhesive surface 39b) with respect to the back plate 16a.

Each of the inner pad 3a and the outer pad 4a includes the substantially U-shaped adhesive surface 39b formed by attaching the sheet-shaped adhesive 38b to a portion of the back surface of the shim plate 34 where the tip end portions 48 of the four pistons 27a, 27c, 28a, 28b are in contact in a state before the inner pad 3a and the outer pad 4a are assembled into the caliper 2a (see FIG. 1). On the other hand, a non-adhesive surface 40b formed of the back surface of the shim plate 34 is provided at a portion of the back surface of the shim plate 34, which is separated from the adhesive surface 39b and includes the portion where the tip end portion 48 of the radially outer side piston 27b at the central portion is in contact.

In this example as described above, the posture of each of the inner pad 3a and the outer pad 4a can be regulated by the four pistons 27a, 27c, 28a, 28b, rather than the radially outer side piston 27b arranged at the central portion. Therefore, during the forward braking and the reverse braking, the formation of the gap between the radially outer side surface of the insertion hole 17a and the radially outer side end portion of the pin 12a can be more effectively prevented. Therefore, the occurrence of the clunk noise can be more effectively prevented when the braking force is released.

In this example, since the tip end portions 48 of the radially outer side piston 27c and the radially inner side piston 28b arranged on the rotation-out side are adhesively fixed to the back surface of the shim plate 34, each of the inner pad 3a and the outer pad 4a can be effectively separated from the rotor 5 (see FIG. 2). Therefore, the dragging of the inner pad 3a and the outer pad 4a can be sufficiently reduced.

Other configurations and operational effects are the same as those of the first example and the second example of the embodiment.

Fourth Example of Embodiment

Figure 19:
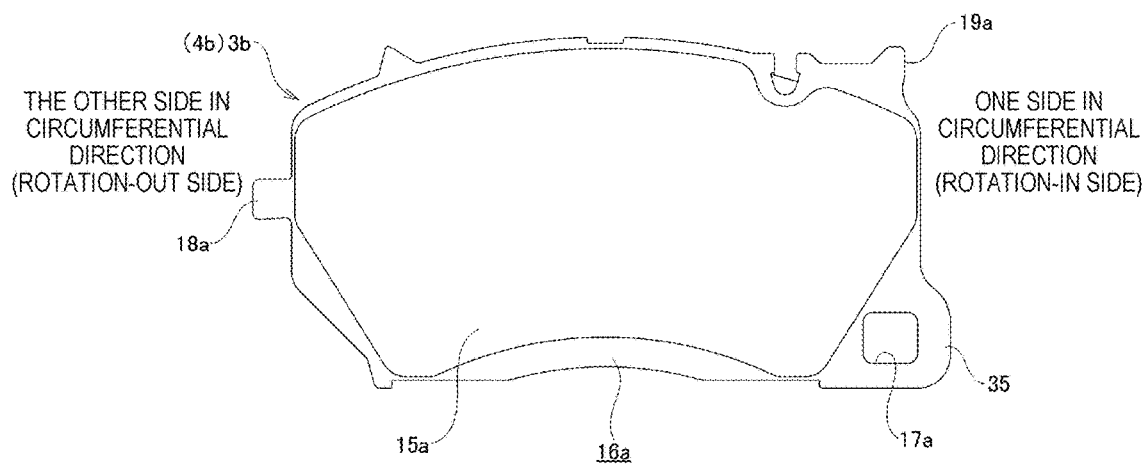
FIG. 19 is a view corresponding to FIG. 12, showing a fourth example of the embodiment.
Figure 20:
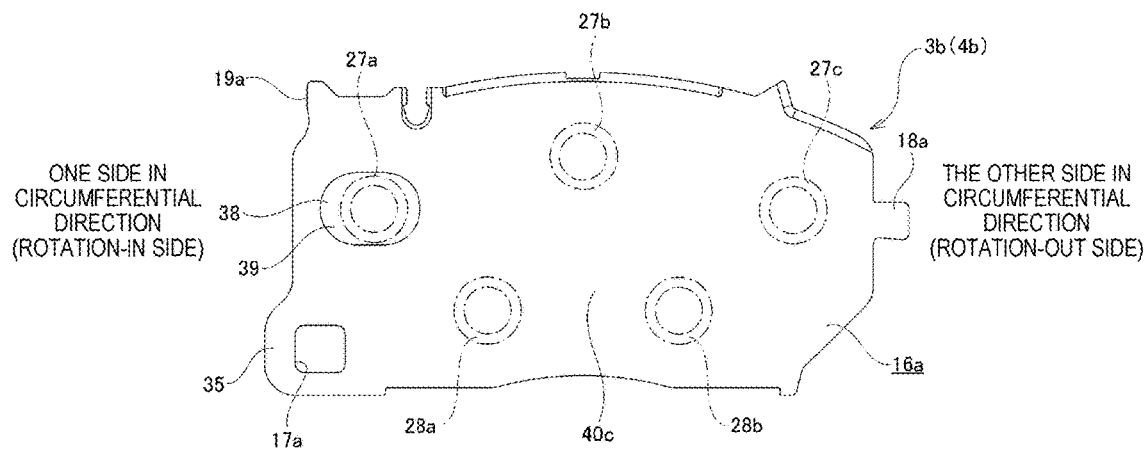
FIG. 20 is a view corresponding to FIG. 13, showing the fourth example of the embodiment.

A fourth example of the embodiment will be described with reference to FIGS. 19 to 20. In this example, the same components as those of the first example of the embodiment are denoted by the same reference numerals as those of the first example of the embodiment, and detailed description thereof is omitted.

In this example, each of the inner pad 3b and the outer pad 4b includes the lining 15a and the back plate 16a. That is, each of the inner pad 3b and the outer pad 4b does not include a shim plate.

In this example, the back plate 16a of each of the inner pad 3b and the outer pad 4b is fixed to the tip end portion 48 of the radially outer side piston 27a arranged at the end portion on the rotation-in side, among the five pistons 27a, 27b, 27c, 28a, 28b. On the other hand, the tip end portions 48 of the four pistons 27b, 27c, 28a, 28b, which are the remaining pistons among the five pistons 27a, 27b, 27c, 28a, 28b, are not fixed to the back plate 16a of each of the inner pad 3b and the outer pad 4b. Therefore, only the tip end portion 48 of the radially outer side piston 27a is fixed to the back plate 16a of each of the inner pad 3b and the outer pad 4b.

Also in a case of this example, the back plate 16a of each of the inner pad 3b and the outer pad 4b is adhesively fixed to the tip end portion 48 of the radially outer side piston 27a arranged at the end portion on the rotation-in side using the sheet-shaped adhesive 38. The adhesive 38 has an elliptical shape slightly larger than the circular outer edge of the tip end portion 48 of the radially outer side piston 27a.

Each of the inner pad 3b and the outer pad 4b includes the adhesive surface 39 formed by attaching the sheet-shaped adhesive 38 to a portion of the back surface of the back plate 16a where the tip end portion 48 of the radially outer side piston 27a is in contact in a state before the inner pad 3b and the outer pad 4b are assembled into the caliper 2a (see FIG. 1). On the other hand, a non-adhesive surface 40c formed of the back surface of the back plate 16a is provided at a portion of the back surface of the back plate 16a, which is separated from the adhesive surface 39 and includes the portion where the tip end portions 48 of the four pistons 27b, 27c, 28a, 28b are in contact.

Also in the case of this example as described above, the posture of each of the inner pad 3b and the outer pad 4b can be regulated by the radially outer side piston 27a. Therefore, during the forward braking and the reverse braking, the formation of the gap between the radially outer side surface in the inner peripheral surface of the insertion hole 17a and the radially outer side end portion of the outer circumferential surface of the pin 12a can be prevented regardless of the moments M1, M2 acting on each of the inner pad 3b and the outer pad 4b. Therefore, the occurrence of the clunk noise can be prevented when the braking force is released.

Other configurations and operational effects are the same as those of the first example of the embodiment.

Fifth Example of Embodiment

Figure 21:
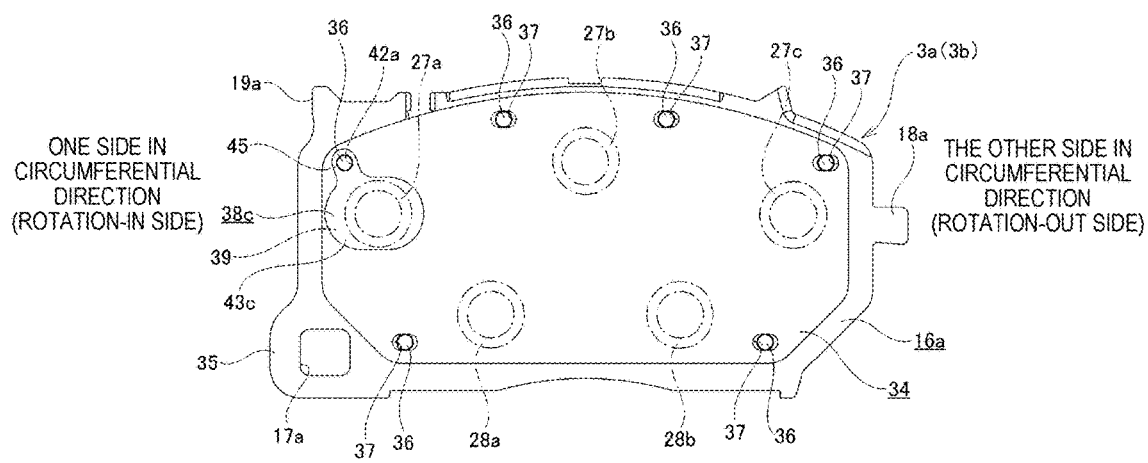
FIG. 21 is a view corresponding to FIG. 13, showing a fifth example of the embodiment.

A fifth example of the embodiment will be described with reference to FIG. 21. In this example, the same components as those of the first example of the embodiment are denoted by the same reference numerals as those of the first example of the embodiment, and detailed description thereof is omitted.

In this example, a method of positioning an adhesive 38c adhesively fixed to the shim plate 34 of each of the inner pad 3a and the outer pad 4a is changed from the structure according to the first example of the embodiment.

That is, in this example, the sheet-shaped adhesive 38c is directly positioned with respect to the back plate 16a of each of the inner pad 3a and the outer pad 4a, instead of being positioned by using a release paper. For this purpose, the adhesive 38c includes an elliptical main body portion 43c and a positioning portion 47 protruding from the main body portion 43c. The positioning portion 47 has an engagement hole 42a.

In this example, when the sheet-shaped adhesive 38c is attached to the back surface of the shim plate 34, the protrusion 36 provided on the back plate 16a is inserted into the engagement hole 42a provided in the positioning portion 47, thereby positioning the sheet-shaped adhesive 38c (the adhesive surface 39) with respect to the back plate 16a. Specifically, the protrusion 36 arranged at the end portion of the radially outer side portion on the one side in the circumferential direction is inserted into the engagement hole 42a.

In this example as described above, since the release paper does not need to be used to position the adhesive 38c, the release paper does not need to be unnecessarily larger than the adhesive 38c.

Other configurations and operational effects are the same as those of the first example of the embodiment.

Sixth Example of Embodiment

Figure 22:
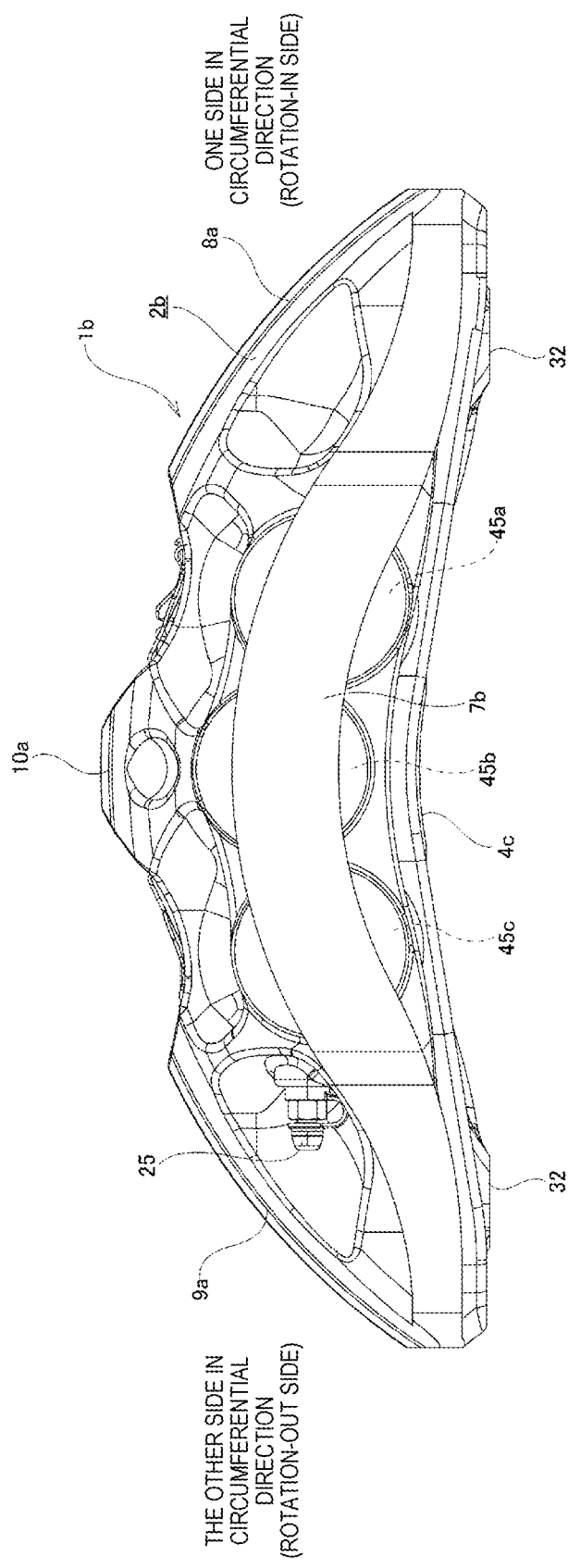
FIG. 22 is a view corresponding to FIG. 1, showing a disc brake device according to a sixth example of the embodiment.
Figure 23:
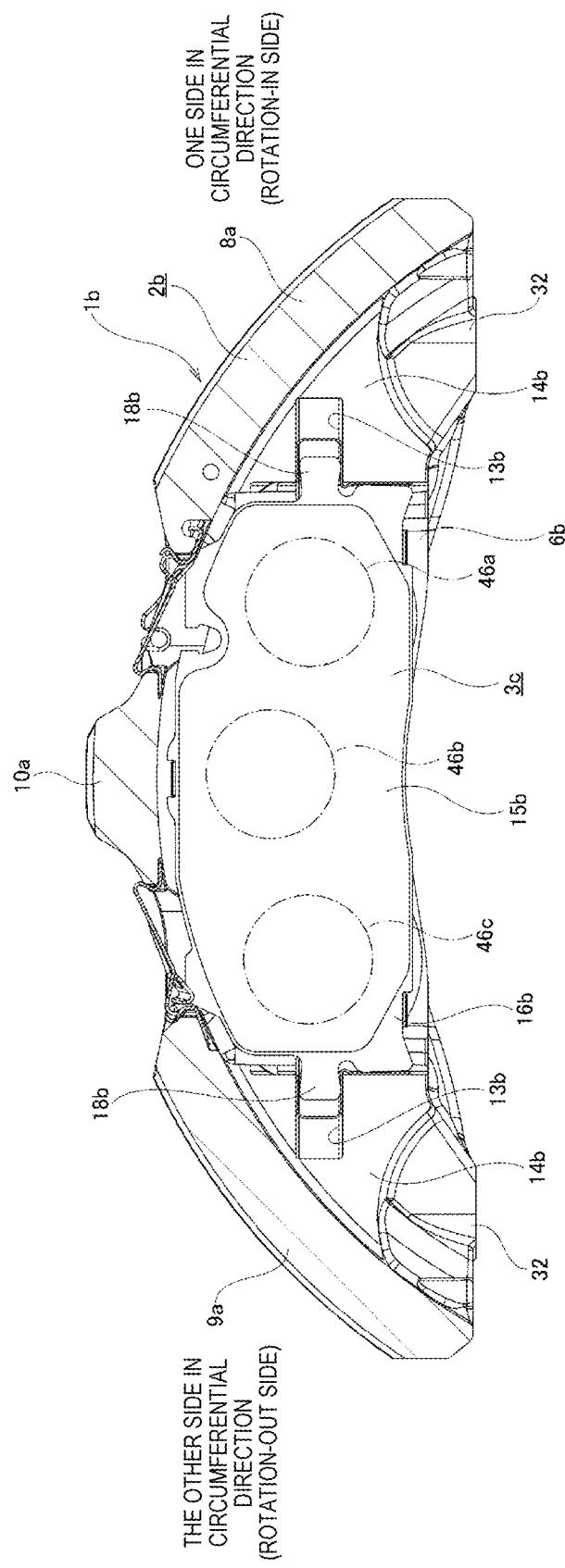
FIG. 23 is a view corresponding to FIG. 9, showing the sixth example of the embodiment.

A sixth example of the embodiment will be described with reference to FIGS. 22 to 23. In this example, the same components as those of the first example of the embodiment are denoted by the same reference numerals as those of the first example of the embodiment, and detailed description thereof is omitted.

In a disc brake device 1b according to this example, each of an inner body 6b and an outer body 7b constituting a caliper 2b includes three cylinders 45a, 45b, 45c.

Each of the inner body 6b and the outer body 7b includes guide wall portions 14b protruding in the axial direction on axially inner side portions of both side portions in the circumferential direction. An radially intermediate portion of the guide wall portion 14b arranged on the one side in the circumferential direction is provided with a guide recessed groove 13b that is open on an axially inner side surface and a side surface on the other side in the circumferential direction. An radially intermediate portion of the guide wall portion 14b arranged on the other side in the circumferential direction is provided with a guide recessed groove 13b that is open on an axially inner side surface and a side surface on the one side in the circumferential direction.

Pistons 46a, 46b, 46c are respectively fitted to the three cylinders 45a, 45b, 45c one by one so as to be displaceable in the axial direction. Therefore, the disc brake device 1b according to this example provides three pistons for each of the inner body 6b and the outer body 7b, and six pistons in total. Although three pistons are provided in the present embodiment, at least two pistons are necessary, and four pistons, five pistons or more may be provided.

Each of an inner pad 3c and an outer pad 4c supported by the caliper 2b so as to be movable in the axial direction includes a lining 15b, a metal back plate 16b and a shim plate (not shown).

The back plate 16b includes protruding lug portions 18b respectively protruding in the circumferential direction, at radially intermediate portions of both side portions in the circumferential direction. Each of the pair of lug portions 18b corresponds to a slide engagement portion, and is engaged with each of the pair of guide recessed grooves 13b provided in each of the inner body 6b and the outer body 7b so as to be movable in the axial direction. Therefore, in this example, forms of the pair of slide engagement portions provided on both side portions of the back plate 16b in the circumferential direction are the same.

In this example, in order to prevent occurrence of a clunk noise, the shim plate of each of the inner pad 3c and the outer pad 4c are adhesively fixed to a tip end portion of the piston 46a arranged at the end portion on the rotation-in side, among the three pistons 46a, 46b, 46c. On the other hand, tip end portions of the two pistons 46b, 46c, which are the remaining pistons among the three pistons 46a, 46b, 46c, are not fixed to the shim plate of each of the inner pad 3c and the outer pad 4c. Therefore, only the tip end portion of the piston 46a arranged at the end portion on the rotation-in side is fixed to the shim plate of each of the inner pad 3c and the outer pad 4c.

Also in a case of this example, the shim plate of each of the inner pad 3c and the outer pad 4c is adhesively fixed to the tip end portion of the piston 46a arranged at the end portion on the rotation-in side by using a sheet-shaped adhesive (not shown). The adhesive has a shape slightly larger than a circular outer edge of the tip end portion of the piston 46a, and is attached to a back surface of the shim plate.

Each of the inner pad 3c and the outer pad 4c includes an adhesive surface formed by attaching the sheet-shaped adhesive to a portion of the back surface of the shim plate where the tip end portion of the piston 46a arranged at the end portion on the rotation-in side is in contact in a state before the inner pad 3c and the outer pad 4c are assembled into the caliper 2b. On the other hand, a non-adhesive surface formed of the back surface of the shim plate 34a is provided at a portion of the back surface of the shim plate, which is separated from the adhesive surface and includes a portion where the tip end portions of the two pistons 46b, 46c are in contact.

Also in the case of this example as described above, a posture of each of the inner pad 3c and the outer pad 4c can be regulated by the piston 46a. Therefore, when a braking force is released, a radially outer side surface and a radially inner side surface of the lug portion 18b arranged on the one side in the circumferential direction (the rotation-in side) can be prevented from vigorously colliding with a radially inner side surface and a radially outer side surface of the guide recessed groove 13b arranged on the one side in the circumferential direction, and thus the occurrence of the clunk noise can be prevented.

Other configurations and operational effects are the same as those of the first example of the embodiment.

Although the embodiment of the present invention has been described above, the present invention is not limited thereto, and can be appropriately changed without departing from the technical idea of the present invention. Further, structures of the examples of the embodiment can be appropriately combined and carried out as long as no contradiction occurs.

The disc brake device according to the present invention is not limited to the opposed piston type disc brake device as described in each example of the embodiment, and can also be applied to a floating caliper type disc brake device. In a case where the present invention is applied to a floating type disc brake device, only an inner pad arranged on a widthwise inner side of a vehicle relative to a rotor, among a pair of pads arranged on both sides of the rotor in an axial direction, are fixed to a piston. In the case where the present invention is applied to the floating type disc brake device, a support corresponding to the pad support member may have a structure in which each of the pair of pads is supported so as to be movable in the axial direction, or may have a structure in which only the inner pad is supported so as to be movable in the axial direction.

When the present invention is carried out, a support structure of the pad with respect to the pad support member is not limited to the structure described in each example of the embodiment, and various known structures in related-art can be adopted.

When the present invention is carried out, the number of pistons that press the pad toward the rotor in the axial direction is not limited to the structure described in each example of the embodiment. In addition, positions and the number of the pistons fixed to the back plate or the shim plate constituting the pad are not limited to the structure described in each example of the embodiment. Further, when the sheet-shaped adhesive is attached to the back surface of the back plate or the shim plate, the positioning can be achieved by using a dedicated jig.

When the present invention is carried out, the pad may be fixed to the tip end portion of the piston by a material joining means such as welding or brazing, or a mechanical joining means such as screwing, press fitting or caulking.

When the present invention is carried out, the adhesive surface may be formed by applying a liquid or jelly adhesive.

When the present invention is carried out, as the slide engagement portion provided at each of both side portions of the back plate in the circumferential direction, an insertion hole that is a through hole, a protruding ear portion (an engagement protruding portion), a recessed notch or the like may be adopted.

When the present invention is carried out, forms of the pair of slide engagement portions provided on both side portions of the back plate in the circumferential direction may be different from each other, or may be the same. For example, the slide engagement portion on one side in the circumferential direction may be an insertion hole, and the slide engagement portion on the other side in the circumferential direction may be an ear portion.

What is claimed is:

1. A disc brake device comprising:
a pair of pads arranged on both sides of a rotor in an axial direction so as to sandwich the rotor;
a pad support member supporting at least one of the pair of pads in a movable manner in the axial direction;
a plurality of pistons configured to press the one of the pads toward the rotor in the axial direction,
wherein slide engagement portions engaged with the pad support member so as to be movable in the axial direction are respectively provided at both side portions of the one of the pads in a circumferential direction, and
wherein the one of the pads is fixed to a tip end portion of at least one piston including at least a piston arranged at an end portion on a rotation-in side or a rotation-out side among the plurality of pistons, and is not fixed to a tip end portion of a remaining piston.

2. The disc brake device according to claim 1,
wherein the one of the pads is adhesively fixed to the tip end portion of at least one piston including the piston arranged at the end portion on the rotation-in side or the rotation-out side among the plurality of pistons, by an adhesive.

3. The disc brake device according to claim 1,
wherein the one of the pads is fixed only to the tip end portion of one piston arranged at the end portion on the rotation-in side among the plurality of pistons.

4. The disc brake device according to claim 1
wherein the pad support member is a caliper, and
wherein the plurality of pistons are fitted to a plurality of cylinders provided in any one of an inner body and an outer body of the caliper.

5. The disc brake device according to claim 1,
wherein the one of the pads includes a lining and a back plate, and
wherein the back plate includes the slide engagement portions at the both side portions in the circumferential direction respectively, and the tip end portion of at least one piston including the piston arranged at the end portion on the rotation-in side or the rotation-out side among the plurality of pistons, is fixed to a back surface of the back plate.

6. The disc brake device according to claim 1,
wherein the one pad includes a lining, a back plate and a shim plate,
wherein the back plate includes the slide engagement portions at the both side portions in the circumferential direction respectively, and
wherein the shim plate is attached to the back plate so as to cover a back surface of the back plate, and the tip end portion of at least one piston including the piston arranged at the end portion on the rotation-in side or the rotation-out side among the plurality of pistons, is fixed to the back surface of the back plate.

7. A disc brake pad, configured to be supported by a pad support member so as to be movable in an axial direction and to be pressed in the axial direction toward a rotor by a plurality of pistons, the disc brake pad comprising:
a lining; and
a back plate,
wherein slide engagement portions engaged with the pad support member so as to be movable in the axial direction are respectively provided at both side portions of the back plate in the circumferential direction, and
wherein the back plate has an adhesive surface at a portion where a tip end portion of at least one piston including at least a piston arranged at an end portion on a rotation-in side or a rotation-out side among the plurality of pistons is in contact, and a non-adhesive surface at a portion there a tip end portion of a remaining piston is in contact.

8. The disc brake pad according to claim 7,
wherein the adhesive surface is formed of a sheet-shaped adhesive.

9. The disc brake pad according to claim 8,
wherein the sheet-shaped adhesive is covered with a release paper that is engaged with a part of the back plate, and is positioned with respect to the back plate.

10. The disc brake pad according to claim 9,
wherein the back plate further includes a protrusion protruding in the axial direction on the back surface, and
wherein the release paper is engaged with the protrusion.

11. The disc brake pad according to claim 8,
wherein the sheet-shaped adhesive is positioned with respect to the back plate by being directly engaged with a part of the back plate.

12. The disc brake pad according to claim 11,
wherein the back plate further includes a protrusion protruding in the axial direction on the back surface, and
wherein the sheet-shaped adhesive is engaged with the protrusion.

13. A disc brake pad, configured to be supported by a pad support member so as to be movable in an axial direction and to be pressed in the axial direction toward a rotor by a plurality of pistons, the disc brake pad comprising:
a lining;
a back plate; and
a shim plate,
wherein slide engagement portions engaged with the pad support member so as to be movable in the axial direction are respectively provided at both side portions of the back plate in the circumferential direction, and
wherein the shim plate is attached to the back plate so as to cover a back surface of the back plate, and
wherein the shim plate has an adhesive surface at a portion where a tip end portion of at least one piston including at least a piston arranged at an end portion on a rotation-in side or a rotation-out side among the plurality of pistons is in contact, and a non-adhesive surface at a portion where a tip end portion of a remaining piston is in contact.

14. The disc brake pad according to claim 13,
wherein the adhesive surface is formed of a sheet-shaped adhesive.

15. The disc brake pad according to claim 14,
wherein the sheet-shaped adhesive is covered with a release paper that is engaged with a part of the back plate, and is positioned with respect to the back plate.

16. The disc brake pad according to claim 15,
wherein the back plate further includes a protrusion protruding in the axial direction on the back surface, and
wherein the release paper is engaged with the protrusion.

17. The disc brake pad according to claim 14,
wherein the sheet-shaped adhesive is positioned with respect to the back plate by being directly engaged with a part of the back plate.

18. The disc brake pad according to claim 17,
wherein the back plate further includes a protrusion protruding in the axial direction on the back surface, and
wherein the sheet-shaped adhesive is engaged with the protrusion.

* * * * *